US008732462B2

(12) United States Patent
Bhathena et al.

(10) Patent No.: US 8,732,462 B2
(45) Date of Patent: May 20, 2014

(54) METHODS AND APPARATUS FOR SECURE DATA SHARING

(75) Inventors: Firdaus Bhathena, Andover, MA (US); Jeffrey Anuszczyk, Framingham, MA (US); Christopher Boran, Reading, MA (US)

(73) Assignee: ZIPTR, Inc., Burlington, MA (US)

( * ) Notice: Subject to any disclaimer, the term of this patent is extended or adjusted under 35 U.S.C. 154(b) by 164 days.

(21) Appl. No.: 13/178,190

(22) Filed: Jul. 7, 2011

(65) Prior Publication Data
US 2013/0013921 A1 Jan. 10, 2013

(51) Int. Cl.
*H04L 9/32* (2006.01)
*H04L 29/06* (2006.01)
*H04L 9/00* (2006.01)

(52) U.S. Cl.
CPC ............ *H04L 63/0471* (2013.01); *H04L 9/002* (2013.01); *H04L 63/045* (2013.01)
USPC .......................................... 713/168; 713/156

(58) Field of Classification Search
CPC ........................... H04L 9/002; H04L 63/0428
USPC ............ 713/150, 159, 161, 168, 171; 380/28, 380/30, 44, 277, 278, 279, 281, 284, 286
See application file for complete search history.

(56) References Cited

U.S. PATENT DOCUMENTS

| | | | | |
|---|---|---|---|---|
| 5,604,801 | A * | 2/1997 | Dolan et al. .................. | 713/159 |
| 5,812,671 | A * | 9/1998 | Ross, Jr. ......................... | 713/153 |
| 6,009,173 | A * | 12/1999 | Sumner ......................... | 713/156 |
| 6,728,378 | B2 * | 4/2004 | Garib ............................. | 380/259 |
| 6,912,285 | B2 * | 6/2005 | Jevans ........................... | 380/284 |
| 7,685,430 | B1 | 3/2010 | Masurkar | |
| 7,836,264 | B2 * | 11/2010 | East et al. ..................... | 711/161 |
| 7,900,041 | B2 * | 3/2011 | Main et al. .................... | 713/155 |
| 8,094,810 | B2 * | 1/2012 | Hohenberger et al. ......... | 380/28 |
| 8,239,957 | B2 * | 8/2012 | Belenky ......................... | 726/26 |
| 2002/0199119 | A1 | 12/2002 | Dunnion et al. | |
| 2004/0017918 | A1 * | 1/2004 | Nicolas ......................... | 380/279 |
| 2004/0168063 | A1 * | 8/2004 | Revital et al. ................. | 713/172 |
| 2006/0150211 | A1 * | 7/2006 | Ritter ............................. | 725/31 |
| 2008/0046982 | A1 | 2/2008 | Parkinson | |
| 2009/0233623 | A1 | 9/2009 | Johnson | |
| 2009/0298487 | A1 | 12/2009 | Przybysz et al. | |

OTHER PUBLICATIONS

Ateniese, Giuseppe, Kevin Fu, Matthew Green, and Susan Hohenberger. "Improved proxy re-encryption schemes with applications to secure distributed storage." ACM Transactions on Information and System Security (TISSEC) 9, No. 1 (2006): 1-30.*

(Continued)

*Primary Examiner* — Saleh Najjar
*Assistant Examiner* — Oleg Korsak
(74) *Attorney, Agent, or Firm* — Wilmer Cutler Pickering Hale and Dorr LLP

(57) ABSTRACT

This disclosure relates to methods and apparatus for securely and easily sharing data over a communications network. As communications services on a communications network are continuously becoming cheaper, faster, and easier to use, more users are becoming receptive to the idea of sharing data over the communications network. However, although E-mails and web folders, to a certain degree, provide easy-to-use or secure data sharing mechanisms, none of the existing data sharing methods is both easy-to-use and highly secure. This disclosure provides methods and apparatus for easily and securely sharing data over a communications network.

22 Claims, 14 Drawing Sheets

(56) References Cited

OTHER PUBLICATIONS

Penrig, Adrian, Dawn Song, and Doug Tygar. "ELK, a new protocol for efficient large-group key distribution." In Security and Privacy, 2001. S&P. 2001. Proceedings. 2001 IEEE Symposium on, pp. 247-262. IEEE, 2001.*

International Search Report and Written Opinion for PCT/US2012/044036, dated Sep. 13, 2012, 12 pages.

* cited by examiner

METHODS AND APPARATUS FOR SECURE DATA SHARING

FIELD OF THE DISCLOSURE

This disclosure relates generally to a system and method for providing secure communication between two or more clients using a server.

BACKGROUND

Communications services on communication networks are continuously becoming cheaper, faster, and easier to use, and are enabling myriads of new, important applications. Data sharing is one of them. As the performance of communication networks improves, more users, both individuals and institutions, resort to communication networks to share data with others. Over communication networks, users can now share multi-gigabyte videos in a matter of minutes; users can exchange real-time messages from all around the world using an instant messenger program; and users can share documents with others almost instantaneously. Communication networks have shaped and modified the way users communicate with others.

As users became accustomed to using communication services over a communication network, users have become more receptive to sharing confidential and private data over public networks as well. One popular communication medium for this purpose is E-mail. E-mails can carry confidential messages and important documents almost instantaneously, and can reduce the burden of printing hard copies and sending them via expensive and slow mail services. Unfortunately, although the E-mail system provides an easy way to share information, the E-mail system fails to provide the level of security desired in many scenarios. For example, financial professionals need to share confidential client information securely; lawyers need to send confidential legal documents to clients; human resources personnel need to share private employee data upon request; and medical professionals need to discuss patient health information with other medical professionals, potentially located off-site. Such confidential information should not be revealed to anyone else but the desired recipient, and the E-mail system as it currently stands does not guarantee that. In fact, an E-mail can be eavesdropped during transfer over public communication networks, and once the E-mail is eavesdropped, the content of the E-mail can be readily viewed by the intruder. Furthermore, anything that is stored on the E-mail server can also be readily accessed by the E-mail service provider. E-mail is not a secure medium for sharing confidential information.

Another popular mechanism for data sharing is a web folder. Some web services provide users with password-protected folders accessible via the web. Using this service, users can store data in a password-protected folder and send the password for the folder to targeted recipients, often using a separate communication medium such as E-mail. The password recipient can, in turn, access the folder using the received password and retrieve the stored data. These web folders can store large files, so they are especially useful for sharing large amounts of information. However, the web folder services are often not user-friendly and are not scalable when many users want to share multiple files. Every time a user wants to share information with another user, the user has to (1) make a password-protected folder for the recipient, (2) store the information in the folder, and (3) send the password for the folder over a communication medium to the recipient. Although this work flow can be manageable for sharing information with a small number of people, this work flow can quickly grow out of hand if a user wants to share information with a large number of people. Web folder services are also not secure enough for many applications. If a third party eavesdrops on the password, then the third party can easily access the information stored in the folder. Furthermore, anything stored in the service provider's server can be readily accessed by the service provider. Therefore, a web folder service is also not suitable for sharing confidential information in a scalable manner.

SUMMARY OF THE INVENTION

Certain embodiments disclose a host server that provides data sharing services. The host server is configured to receive, from a first client, a communication request that includes an encrypted conversation, a first key, and authentication bits. The communication request requests that the host server sends the encrypted conversation and a decryption key for the encrypted conversation to a second client, where the first key is the decryption key that has been encrypted using a first public key associated with a first user at the first client. In order to retrieve the decryption key from the first key, the host server retrieves an encrypted secret key associated with the first user and decrypts the encrypted secret key using the authentication bits included in the communication request received from the first user, thereby retrieving a secret key associated with the first user. Then, the host server retrieves an encrypted private key associated with the first user and decrypts the encrypted private key using the secret key associated with the first user, thereby retrieving a private key associated with the first user. Subsequently, the host server decrypts the first key using the private key associated with the first user, thereby retrieving the decryption key. Once the decryption key is retrieved, the host server encrypts the decryption key using a second public key associated with a second user at the second client to generate a second key, and sends to the second client the encrypted conversation and the second key.

DESCRIPTION OF EXAMPLE EMBODIMENTS

The system and method of the present invention address the security issues and scalability issues found in known systems. At a high level, the design philosophy for this data sharing system is that (1) the system should be as easy to use as E-mail and (2) the system should be secure to the extent that in a rare event in which the data sharing system is breached by a third party, data stored on the system are not readily revealed to the third party. To this end, in a preferred embodiment of the present invention, the data sharing system employs a conversation model with added security features. Using this system, a user initiates a conversation with other users and shares documents with them by adding the documents to the conversation. Such a conversation model can allow for an easy, seamless sharing of messages and documents among all users participating in the conversation.

In a preferred embodiment of the present invention, the data sharing system performs tasks to enhance security of the conversation. These tasks are performed in the background and are completely transparent to users. For example, the data sharing system encrypts the conversation using an encryption key so that third parties that do not participate in the conversation cannot view the conversation. To read encrypted conversation, users participating in the conversation might need to decrypt the encrypted conversation using a decryption information. This decryption information is called a decryption key. The data sharing system shares the decryption key in the background in such a way that only the users participating in the conversation are capable of decrypting the encrypted conversation. To further improve the security, the data sharing system also encrypts the decryption key before sharing the decryption key with users in the conversation. This way, even if a third party eavesdrops on the decryption key, the third party cannot immediately gain access to the conversation.

The data sharing system maintains encrypted shared data and the encrypted decryption information in a server. For improved security, the server does not maintain the information to decrypt the encrypted decryption information, so even if the server is breached by a third party, the third party does not have the information to decrypt the encrypted decryption information. Therefore, even in a rare event a third party breaches the security protections of the server, the third party cannot decrypt the encrypted shared data in the server. In some embodiments, the data sharing system encrypts each conversation using a unique encryption key so that even if a third party identifies one of the decryption keys in the server, the third party cannot access all the shared data.

Figure 1:
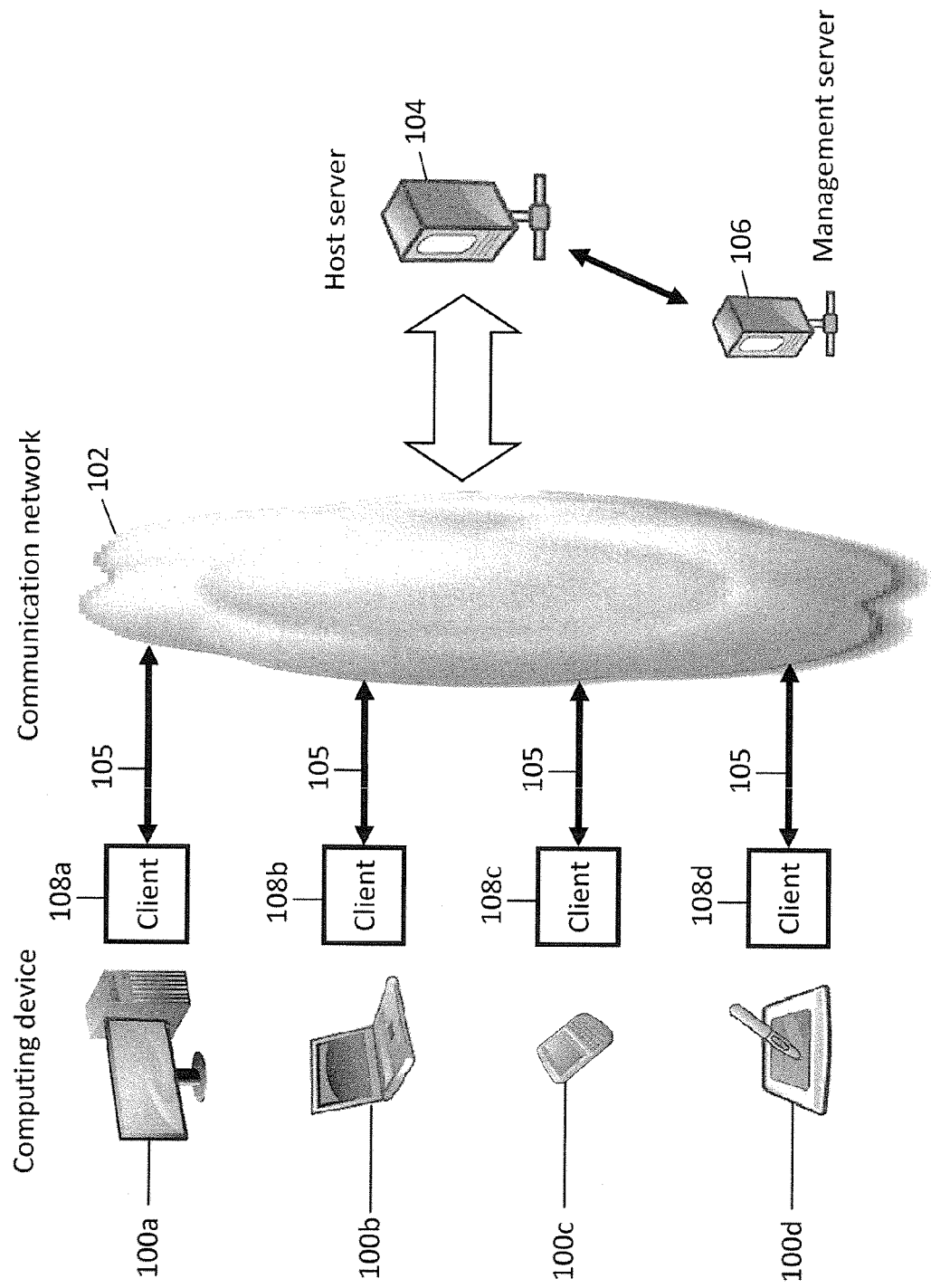
FIG. 1 shows a communication system implementing a secure data sharing system in accordance with certain embodiments of the present invention.

FIG. 1 illustrates a system architecture for secure and easy data sharing in accordance with certain embodiments of the present invention. The system of FIG. 1 includes computing devices 100a-d, clients 108a-d running on the computing devices 100, a communication network 102, a host server 104, communication channels 105, and a management server 106. The computing devices 100a-d provide a platform for running clients 108 to access the data sharing system. The computing devices 100a-d includes a desktop computer 100a, a mobile computer 100b, a tablet computer 100c, and a cellular device 100d. Other computing devices can be used as well. The clients 108 communicates with a host server 104 to access the data sharing system. Although FIG. 1 represents the host server 104 as a single server, the host server 104 can include more than one server and can be part of a cloud-computing platform.

The communication network 102 provides a communication channel 105 between the host server 104 and the clients 108. The communication network 102 includes the internet, a cellular network, a telephone network, a computer network, a packet switching network, a line switching network, and/or any other networks that accommodate data communication between network nodes. The management server 106 oversees operations of the host server 104. The management server 106 provides information to decrypt and retrieve shared data maintained in the host server 104. This can be useful when, for instance, a user misplaces the password to access the data sharing system. The host server 104 and the clients 108 support the public key cryptography mechanism. Each client 108 maintains a unique X.509 public/private key pair. The public key is used to transform (i.e., encrypt) data into an unreadable form, and the encrypted data can only be restored (i.e., decrypted) into a readable form using the paired private key. By publishing the public key to a general public, anyone can create data content that can only be read by the owner of the private key paired with the public key. In a preferred embodiment, the host server 104 also maintains client's private key, but in an encrypted form, so that when given a permission, the host server 104 can decrypt data content that had been encrypted with client's public key.

Figure 2:
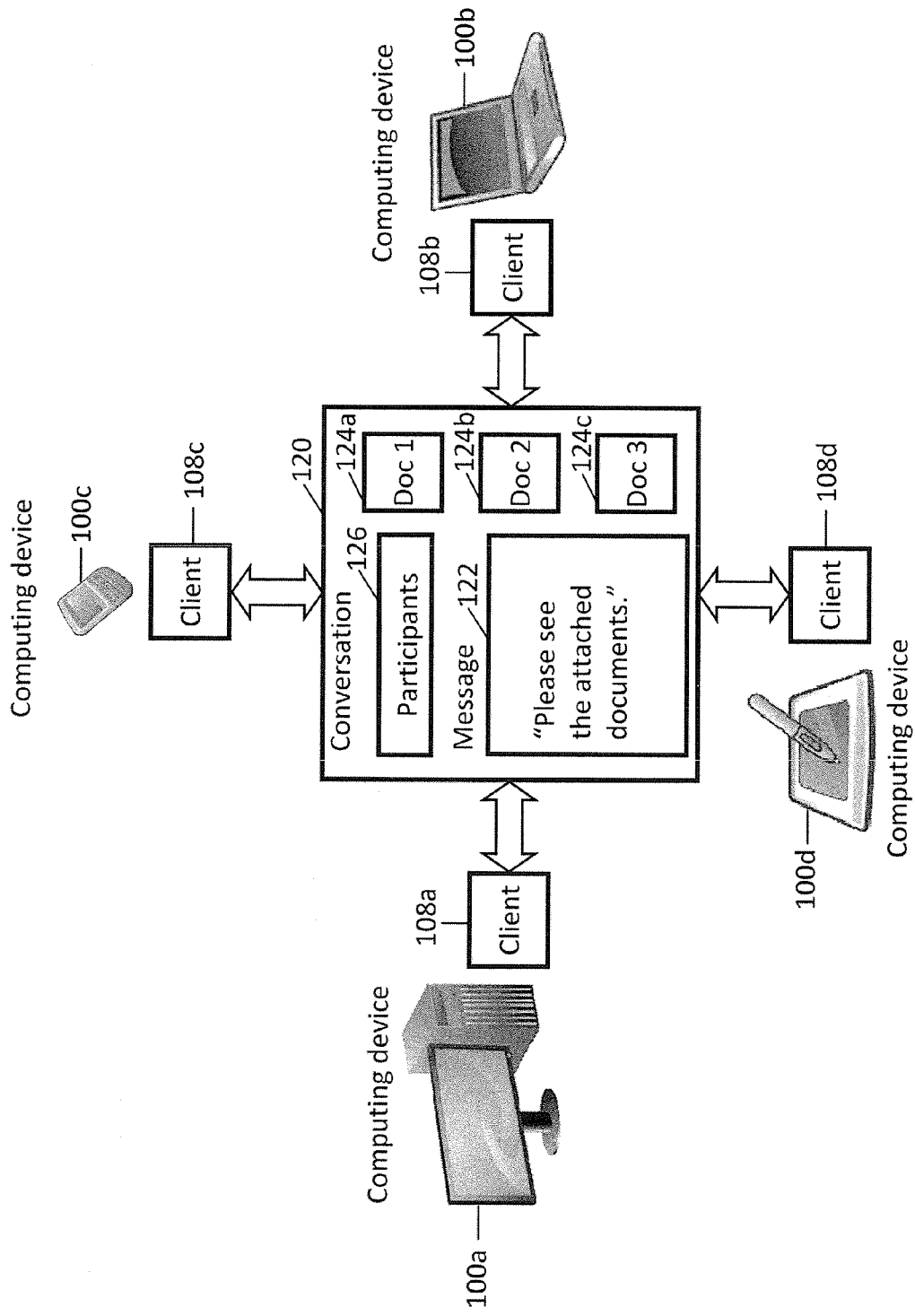
FIG. 2 illustrates a conversation between one or more clients in accordance with certain embodiments of the present invention.

In a preferred embodiment, the client 108 includes a communication interface to communicate with the host server 104. The communication interface in the client 108 accommodates a secure communication channel 105 between the computing device 100 and the host server 104. In a preferred embodiment, the communication interface establishes a secure communication channel 105 using a transport layer security (TLS) cryptographic protocol. However, the communication interface can establish a secure communication channel 105 using other cryptographic protocols, including a secure shell (SSH), an IP security (IPSec), and a virtual private network (VPN). The client 108 can be implemented as (1) a program running on the computing device 100, (2) a web application that runs inside a web browser on the computer device 100, or (3) a mobile device application. The client 108 can also include a user interface supporting a conversation model. FIG. 2 illustrates the conversation model supported by the user interface in accordance with certain embodiments of the present invention. A group of users can participate in a conversation 120, which include a message 122, zero or more shared documents 124a-c, and a list of participants 126. The message 122 can include both text and image information. Participants share the conversation 120 via the host server 104. One of the participants initiates a conversation 120 by sending a conversation request to the host server 104. The conversation request includes the conversation 120 and other decryption information described in detail below. The host server 104 subsequently relays the received conversation 120 to other participants, essentially serving as an anchor node for the conversation 120.

The data sharing system of FIG. 1 can be vulnerable to security breaches at (1) the communication channel 105 between the host server 104 and the client 108 and (2) the host server 104 itself. The communication channel 105 is relatively secure from security breaches since the communication channel employs a cryptographic protocol for secure communication. Furthermore, the data communication is transient and does not leave traces of shared information. Therefore, if a third party does not eavesdrop on the conversation at the right time, the third party may never be able to access the sought information. However, the host server 104 can leave traces of shared conversation. In fact, the host server 104 maintains the shared conversation for future access. Although the host server 104 can employ firewalls to protect the shared conversation from third party security attacks, firewalls can be breached under certain circumstances. Therefore, the security problem can be more prominent and noticeable at the host server 104. To protect the shared information from third party attacks even when the host server 104 is breached, in a preferred embodiment, the client 108 encrypts the conversation 120 before sending the conversation 120 to the host server 104. This can effectively bar the host server 104, as well as any potential security breakers, from accessing the shared conversation. The client 108 also encrypts the decryption key for the encrypted conversation before sending the decryption key to the host server 104 to ensure that the host server 104 cannot decrypt the shared information. This way, even if the third party accesses all the information stored in the host server 104, the third party cannot decrypt the encrypted conversation.

In a preferred embodiment, a host server 104 identifies a user with a unique username and the associated password. Therefore, a user logs onto the data sharing system by providing a username and a password. For authentication purposes, a host server 104 maintains usernames and associated passwords of all users in a database. When one of the users requests authentication by providing a username and a password, the host server 104 accesses the database to verify (1) if the username exists in the database, and if so, (2) if the provided password matches the password associated with the username. In a preferred embodiment, the host server 104 does not maintain passwords in its original form. Instead, the host server 104 maintains only an encrypted version of the passwords without any decryption information. The passwords can be encrypted using a cryptographic hash function, but they can also be encrypted using conventional symmetric/asymmetric cryptographic methods.

Figure 3:
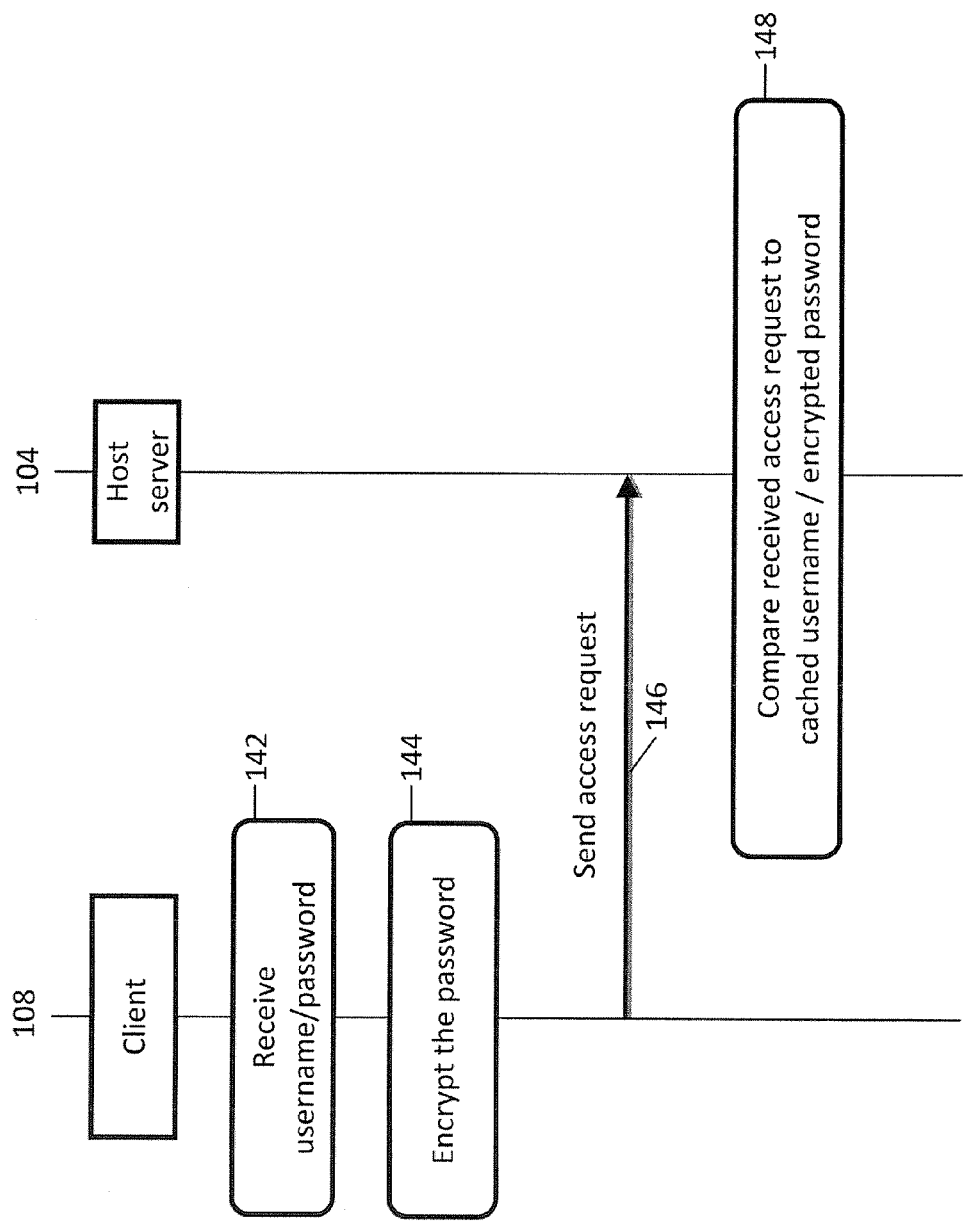
FIG. 3 shows a flow diagram illustrating how a client logs onto a host server in accordance with certain embodiments of the present invention.

FIG. 3 illustrates how a user logs onto the secure data sharing system using a client in accordance with certain embodiments of the present invention. In step 142, the client 108 receives a username and a password. In step 144, the client 108 encrypts the received password. In a preferred embodiment, the password is encrypted using a salt value and a key derivation function. A salt value is a set of random bits that are used to generate an encrypted password. The salt value and the password are input to a key derivation function to generate an encrypted password. The salt value is fixed for a particular use. For example, the salt value for authentication purposes is fixed and can be unique for each user. In other embodiments, the password is encrypted using a cryptography method. A cryptography method includes using an encryption key X to encrypt data and using a decryption key Y to decrypt the encrypted data. When X is different from Y, the method is called asymmetric; when X is identical to Y, the method is called symmetric. As is described below, the host server 104 verifies the user without decrypting the encrypted key, therefore the host server 104 does not maintain the decryption key Y to authenticate the password encrypted using the encryption key X. In step 146, the client 108 sends an access request to the host server 104 over a secure communication channel. The access request includes the username and the encrypted password. In step 148, the host server 104 compares the received username and encrypted password to the stored username and encrypted password to authenticate the client 108. This allows for a secure client authentication without sending the un-encrypted password over the communication channel and without maintaining the un-encrypted password at the host server 104.

In accordance with certain embodiments, once a user logs into the data sharing system, the user can initiate a conversation. As is illustrated in FIG. 2, in a preferred embodiment, the conversation includes fields such as a message, shared documents, and the list of conversation participants. A user initiates the conversation by completing these fields in the conversation and by sending a conversation request to the host server. The conversation request includes the conversation to be relayed to conversation participants. Upon receiving the conversation request, the host server 104 extracts the list of conversation participants and relays the conversation to those participants. The client for each participant receives the conversation and stores the conversation in a local storage device so that whenever a user wants to view the conversation, the client can rapidly retrieve the conversation from the local storage device and provide the conversation to the user. In a preferred embodiment, the client stores an encrypted version of the conversation so that the conversation can only be accessed and decrypted by logging into the client. If the client had generated the conversation, the client encrypts the conversation itself before storing the conversation; if the client had received the conversation from the host server 104, then the client does not have to encrypt the conversation itself since the received conversation is already encrypted.

Figure 4:
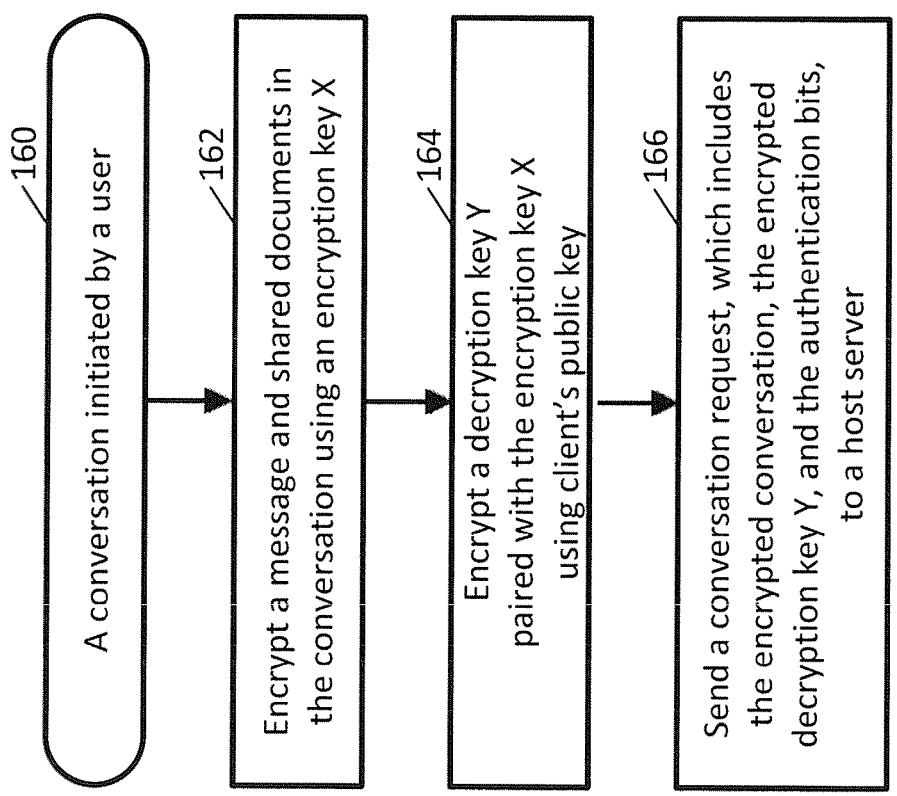
FIG. 4 illustrates how a client encrypts a conversation in accordance with certain embodiments of the present invention.

In a preferred embodiment, the host server 104 also maintains the conversation in its storage device so that if another user joins the conversation at a later time, the host server 104 will relay the stored conversation to the added user. Because the host server 104 maintains the conversation, the conversation can be vulnerable to third party security attacks. Therefore, in a preferred embodiment, the client initiating the conversation, named client A, encrypts the conversation before sending the conversation request to the host server. FIG. 4 illustrates, in accordance with a preferred embodiment, how client A encrypts the conversation before sending a conversation request to the host server 104. In step 160, client A receives a conversation that includes a message and shared documents. In step 162, client A encrypts the message and the shared documents in the conversation using a cryptography method. As mentioned earlier, the cryptography method uses an encryption key X to encrypt the data and uses a decryption key Y to decrypt the encrypted data. Since the conversation participants receive an encrypted conversation, the conversation participants need to receive the decryption key Y from the client A in order to read the encrypted conversation. Therefore, the client A sends the decryption key Y, as well as the encrypted conversation, to the host server 104 so that the host server 104 will relay both the encrypted conversation and the decryption key Y to the conversation participants. In preferred embodiment, each message/document is encrypted using a unique encryption key X, each associated with a unique decryption key Y. Before client A sends the decryption key Y to the host server, client A encrypts the decryption key Y using client A's public key, as shown in step 164. This can ensure that even if a third party eavesdrops on the decryption key Y, the third party cannot recover the un-encrypted version of the decryption key Y. In step 166, the client A sends a conversation request to the host server 104. In a preferred embodiment, the conversation request includes at least (1) the encrypted conversation, (2) the encrypted decryption key Y, and (3) the authentication bits. As is detailed below, the authentication bits can provide a permission to the host server 104 to decrypt the encrypted decryption key Y. The authentication bits include a password encrypted using a salt value. As is mentioned earlier, the salt value is fixed for a particular use. In other words, the salt value for the decryption purpose can be different from the salt value for the authentication purpose, described in relation to FIG. 3.

In accordance with certain embodiments, upon receiving the conversation request from client A, the host server 104 relays the encrypted conversation and the encrypted decryption key Y to other conversation participants. Before relaying the encrypted decryption key Y, the host server processes the encrypted decryption key Y so that the encrypted decryption key Y is in a form that other conversation participants can decrypt. In a preferred embodiment, the host server (1) decrypts the encrypted decryption key Y using client A's private key, (2) re-encrypts the decryption key Y for each conversation participant using the participant's public key, and (3) sends the re-encrypted decryption key Y, which is distinct for each participant, to the participants. This process assumes that client A's private key is available at the host server.

In a preferred embodiment, the host server maintains the private key of each user. Each private key in the host server is encrypted using a secret key, which is unique to the user. The secret key is selected such that the same secret key can encrypt the private key and decrypt the encrypted private key. In a preferred embodiment, the secret key is a 256-bit Advanced Encryption Standard (AES) key. The secret key is maintained by the host server in an encrypted form, and the decryption key for the encrypted secret key is the authentication bits provided by the client in the conversation request. Therefore, once the client provides the authentication bits to the host server, the host server uses the authentication bits to decrypt the secret key and uses the decrypted secret key to decrypt the client's private key.

The host server then uses the decrypted private key to decrypt the encrypted decryption key Y. This decryption chain shows that the client grants a permission to decrypt the encrypted decryption key Y by providing the authentication bits. Once the host server has the decryption key Y, the host server re-encrypts the decryption key Y and sends the encrypted conversation and the re-encrypted decryption key to other conversation participants. Upon receiving the encrypted conversation and the re-encrypted decryption key, the conversation participants use their own private keys to decrypt the re-encrypted decryption keys Y and use the decrypted decryption key Y to decrypt the encrypted conversation.

Figure 5:
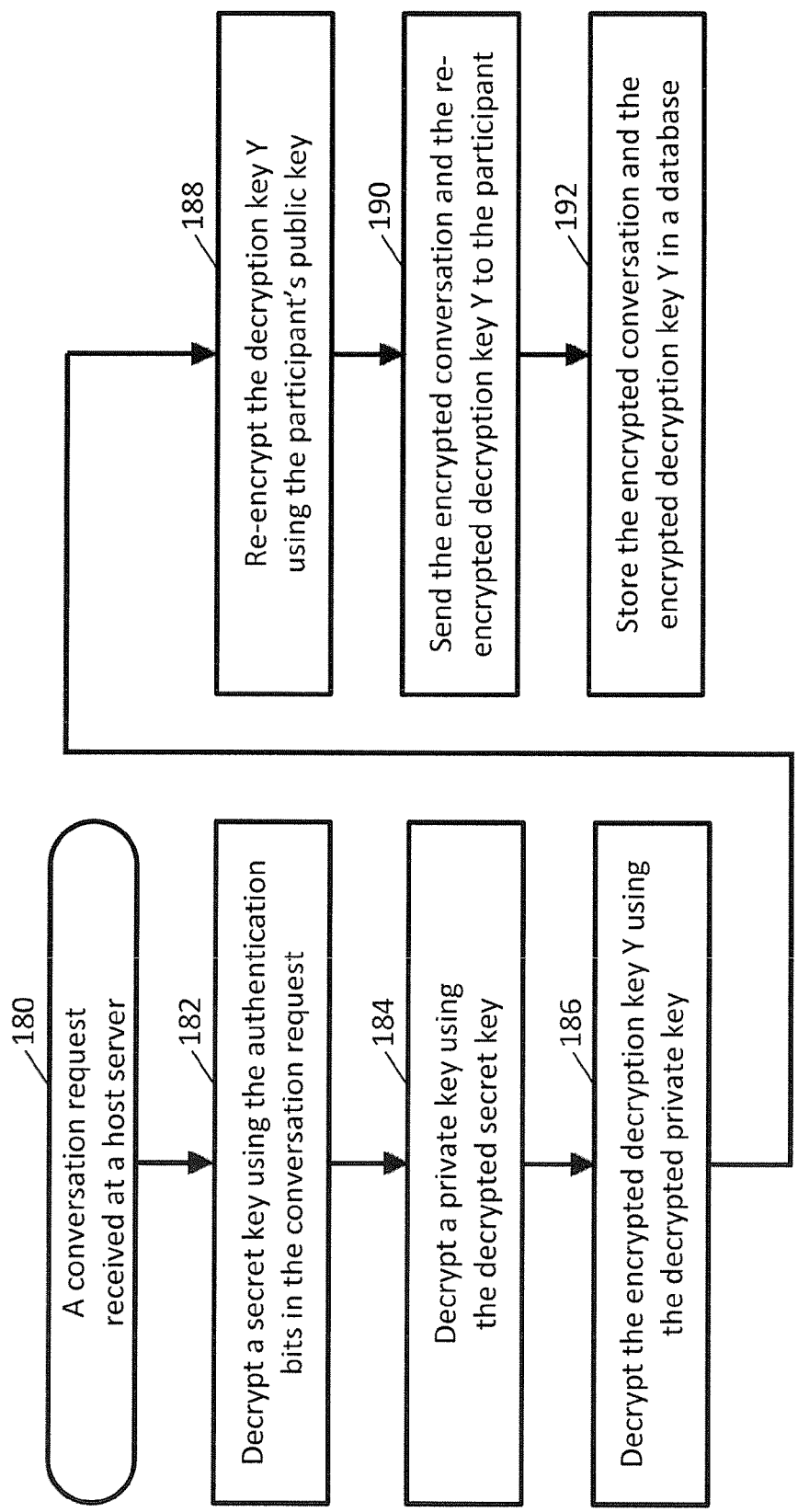
FIG. 5 illustrates how a host server relays encrypted conversation to conversation participants in accordance with certain embodiments of the present invention.

FIG. 5 illustrates how a host server processes a conversation request from a client in accordance with the preferred embodiment described above. In step 180, the host server receives a conversation request from the client A. In step 182, the host server extracts the authentication bits from the conversation request and uses the authentication bits to decrypt client A's secret key, which is maintained by the host server in an encrypted form. Once the host server decrypts the secret key, the host server erases the authentication bits to reduce security risks. In step 184, the host server uses the decrypted secret key to decrypt client A's private key, which is also maintained by the host server in an encrypted form. Once the host server 104 decrypts the private key, the host server 104 erases the decrypted secret key to reduce security risks.

In step 186, the host server 104 uses the decrypted private key to decrypt the encrypted decryption key Y. In the following steps, the host server 104 re-encrypts the decryption key Y in such a way that the conversation participants can decrypt the re-encrypted decryption key Y. In step 188, the host server 104 encrypts the decryption key Y using each of the other participant's public key, generating N−1 encrypted decryption keys. N represents the total number of conversation participants. Once the host server 104 re-encrypts the decryption key Y, the host server 104 erases the decryption key Y. In step 190, the host server sends the encrypted conversation and the re-encrypted decryption key to conversation participants. In step 192, the host server stores the encrypted conversation and the encrypted decryption key Y in a database. The step 192 is independent of the decryption key transformation steps (steps 180-190); the step 192 can be performed before or after each of the decryption key transformation steps.

FIG. 5 shows that the secret key provides a layer of security to the private key. In a preferred embodiment, the secret key is also used to encrypt encryption key information maintained by the host server 104. For example, in step 192 of FIG. 5, the host server 104 uses the secret key to encrypt the public/private key pair and a client key before storing them in a database. The details of the client key is presented with respect to FIG. 8. The secret key is entirely internal to the host server 104, and is not visible or accessible from the network. In other words, there isn't any application programming interface (API) functions or instructions to request the secret key from an external device. Therefore, the secret key is completely transparent to conversation participants and a third party interested in stealing information from the host server 104. Even if a third party copies all the information accessible via all known APIs, the third party still cannot copy the secret key information because the API for accessing secret keys is not available to the third party. Because the copied information is encrypted using a secret key and because the third party does not have the secret key, the third party cannot decrypt the copied information. Therefore, the secret key mechanism provides a tight security to the private information without degrading the user experience. If, in a rare event that the secret key is revealed to a third party, the system generates a new secret key and re-encrypt the stored data using the re-generated secret key. Although FIG. 5 illustrates the secret key as a symmetric encryption/decryption key, the steps in FIG. 5 can easily be modified to accommodate an asymmetric secret key.

In a preferred embodiment, the secret key is unique to each user. In this embodiment, there is no single key that would grant access to all the data stored on a host server. In order to access all the data stored on the host server, the third party will have to (1) access encrypted secret keys for all users, (2) decrypt each of the encrypted secret keys by trying out all possible password combinations, which is also called a brute-force attack, and (3) decrypt the encrypted data stored on the server. As mentioned above, secret keys are transparent to a third party. Therefore, accessing secret keys for all users is a challenging problem. Even if the third party does access all the secret keys, decrypting the encrypted secret keys using a brute-force attack is time-consuming, if at all possible. Therefore, it is unlikely that a third party can perform these steps to access all the data stored on the host server.

Once a conversation is established, any client participating in the conversation can add a message or a document to the conversation. In certain embodiments, a client encrypts the added information using steps illustrated in FIG. 4, and the host server 104 relays the encrypted information and the decryption key using steps illustrated in FIG. 5. In another embodiment, every client participating in the conversation maintains an encryption key X and its decryption key Y for the conversation. These clients receive the encryption key X and the decryption key Y when the client A initiates the conversation. For instance, the client A sends the encryption key X and the decryption key Y to the host server 104 in step 166 of FIG. 4 and the host server 104 relays the encryption key X and the decryption key Y to other conversation participants in step 190 of FIG. 5. In this embodiment, when a client wants to add information to the conversation, the client encrypts the information using the received encryption key X and send the encrypted information to the host server. Since every client in the conversation maintains the decryption key Y, the host server simply relays the encrypted information to the other participants without performing the decryption key transformation steps of FIG. 5.

If a client was disconnected from the network, or if a user is accessing a conversation from a different computing device, the conversation stored in the local computing device may not be up-to-date. In a preferred embodiment, the data sharing system accommodates a timestamp protocol to synchronize conversations stored in clients and the host server. In the timestamp protocol, a client and a host server 104 maintain a separate timestamp for each object type, which includes a message in a conversation, a document in a conversation, a conversation etc. The client and the host server 104 communicate to compare the timestamps and if the timestamps are different, the client or the host server 104 initiates the synchronization procedure to synchronize the data stored in the client and the host server.

Figure 6:
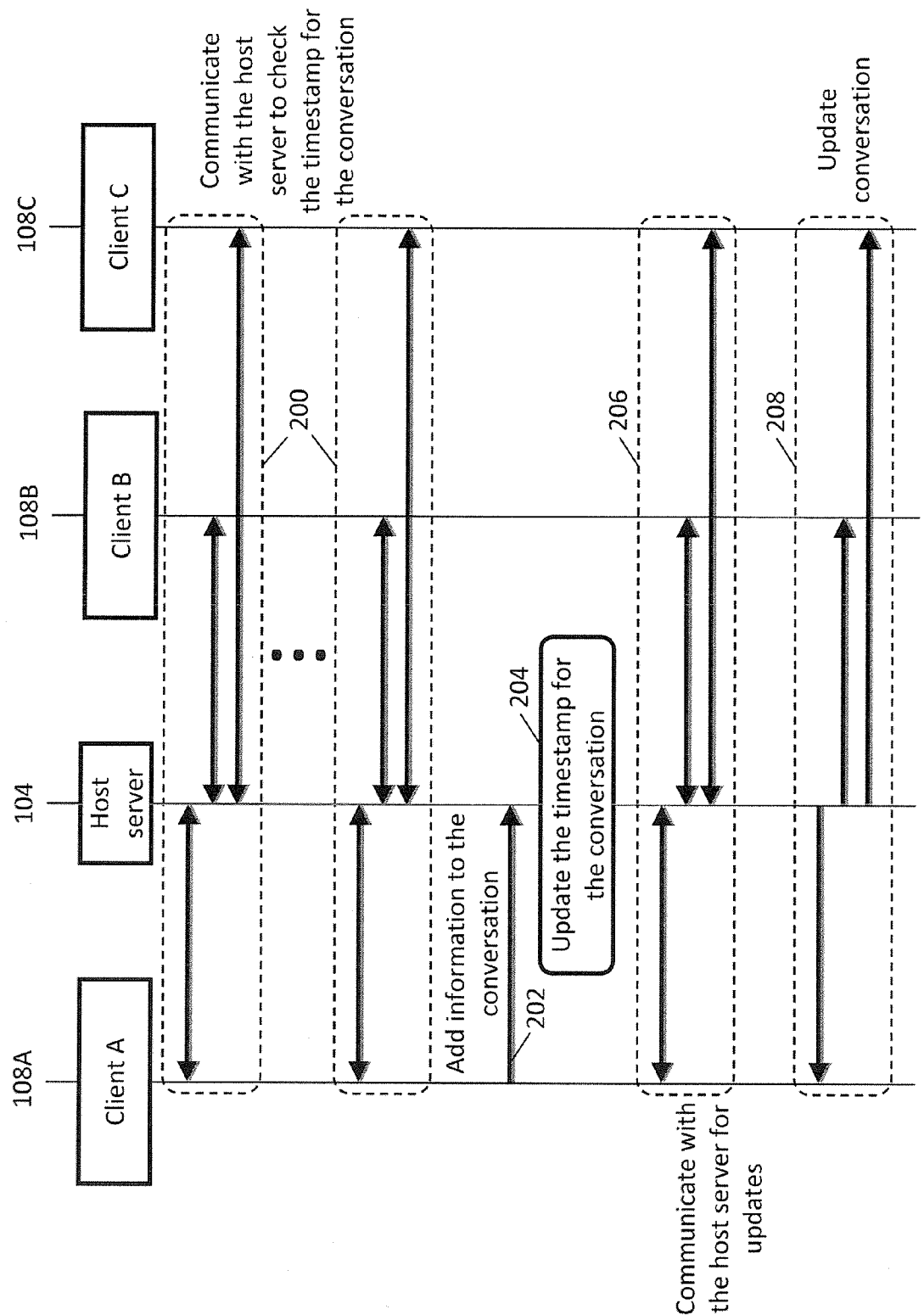
FIG. 6 illustrates how a conversation is synchronized among one or more clients in accordance with certain embodiments of the present invention.

FIG. 6 illustrates the synchronization procedure in accordance with the preferred embodiment. In this embodiment, the host server 104 calculates and updates the timestamp for each updated object type in the conversation. In step 200, each client 108 sends a timestamp request message to the host server 104 to request the maximum timestamp value for each object type in the shared conversation. The maximum timestamp value indicates the time at which the object type is updated the very last time. The clients 108 can send the timestamp request message periodically or when a timestamp check event occurs. The timestamp check event includes at least (1) a boot-up of the computing device, and (2) a re-connection to the communication network after being disconnected. When the host server 104 receives a timestamp request message, the host server 104 sends a timestamp response message to the clients 108, the timestamp response message including the maximum timestamp value for each object type in the shared conversation. Each client 108 compares the received maximum timestamp values to the locally stored maximum timestamp values, and if all the values match, the client 108 is assured that the conversation has not been updated or changed. The timestamp request message and the timestamp response message are lightweight messages that do not generate much data traffic.

At some point, one of the conversation participants can add information to the conversation. In step 202, client A 108a adds new information to the conversation and sends the added information to the host server 104. In step 204, the host server 104 stores the information received from client A 108a, calculates a new timestamp for the conversation, and updates the timestamp on the host server 104 to the new timestamp.

Sometime later, each client 108 sends a timestamp request message. In step 206, each client 108 sends a timestamp request message to the host server 104 to request the maximum timestamp value for each object type in the shared conversation. As in step 200, the host server 104 sends a timestamp response message to the clients 108, the timestamp response message including the maximum timestamp value for each object type in the shared conversation. Then each client 108 compares the received maximum timestamp values to the stored maximum timestamp values. Since client A 108a added new information to the conversation in step 202, the maximum timestamp value corresponding to the object type of the added information would not match. Therefore, each client 108 becomes aware that the object type with different timestamp values has been updated.

When the client 108 notices that the object type has been updated in the conversation, the client 108 sends a timestamp profile request to the host server 104 to request a description or summary of what has changed for that specific object type. The timestamp profile request includes the locally stored (i.e., stored at the client 108) maximum timestamp value of the specified object type. The host server 104 replies to the timestamp profile request by sending a timestamp profile response to the client 108. The timestamp profile response indicates the changes made to the specified object type since the time indicated by the received timestamp (i.e., the maximum timestamp value of the specified object type that was stored at the client). The timestamp profile response can include the identification of the object type and state information that includes at least whether the object type has been deleted/read/updated. The client 108 analyzes the timestamp profile response and sends a data update request to the host server 104, the data update request requesting the host server 104 to send changes corresponding to the specified object type.

In certain embodiments, the timestamp profile request can trigger the host server 104 to send a summary of all the changes made to any of the conversations associated with the user at the client 108. In this case, the timestamp profile response includes a description or summary of all the conversations that have changed. The client 108 then analyzes the timestamp profile response and sends a data update request, associated with one of the changed conversations, to the host server 104. The client 108 can send the data update request until every conversation is synchronized with the host server 104.

In step 208, the client 108 receives, from the host server 104, (1) the difference between the information stored at the client 108 and the information stored at the host server 104 and (2) the new timestamp to be used for the updated object type.

In another embodiment, the timestamp request message and the timestamp profile request can be merged into a single message. In step 200, the clients 108 sends a timestamp check message to the host server 104 to ask for changes in timestamp values across all object types in the shared conversation. The timestamp check message performs the functionality of a timestamp request message and a timestamp profile request. The timestamp check message sent from the client 108 to the host server 104 includes timestamp values across all object types maintained at the client 108. If the timestamp values in the timestamp check message matches the timestamp values stored in the host server 104, then the host server 104 does not initiate any actions. However, if one of the timestamp values in the timestamp check message does not match the corresponding timestamp value stored in the host server 104, then the host server 104 initiates data transfer for the object type associated with the timestamp value. In step 208, the each client 108a-c receives, from the host server 104, (1) the difference between the information stored at the respective clients 108a-c and the information stored at the host server 104 and (2) the new timestamp to be used for the updated object type.

In yet another embodiment, the client 108, instead of the host server 104, can calculate the timestamp and send the new timestamp to the host server 104. In step 202, when client A 108a adds new information to the conversation, client A 108a can also update the timestamp locally to the time at which the client A received the new information. Then client A sends the updated timestamp, along with the added information, to the host server 104. In step 204, the host server 104 stores the information received from client A 108a and updates the timestamp on the host server 104 to the new timestamp received from client A 108a. In step 206, the clients 108a-c communicate with the host server 104 to ask for changes in timestamp values across all object types in the shared conversation, and client B 108b and client C 108c notice the timestamp discrepancies. In step 208, client B 108b and client C 108c receive, from the host server 104, (1) the difference between the information stored at the respective clients 108b-c and the information stored at the host server 104 and (2) the new timestamp to be used for the updated object type.

In another embodiment, all communication between the clients and the host server are timestamp-based. In this embodiment, the host server 104 can initiate a timestamp check to check whether one of its clients has updated the conversation or initiated a conversation. For example, instead of step 166 in FIG. 4, in which the client A sends a conversation request to the host server, the client A simply (1) prepares a conversation request, (2) places the conversation request in a communication queue between the client and the host server, and (3) updates the timestamp for the conversation request. Then the host server 104 can initiate a timestamp check with all clients associated with itself. When the host server 104 recognizes that client A has added a conversation request to the communication queue, the host server 104 can trigger the transfer of the conversation request.

In certain embodiments, client A encrypts a conversation using a symmetric encryption method. In some embodiments, the client A encrypt messages and documents in a conversation using two different encryption keys or using two different encryption methods. In other embodiments, the secret key is derived from an asymmetric encryption method. One skilled in the art can modify FIGS. 4-6 to implement these distinct, yet closely related, embodiments.

Figure 11:
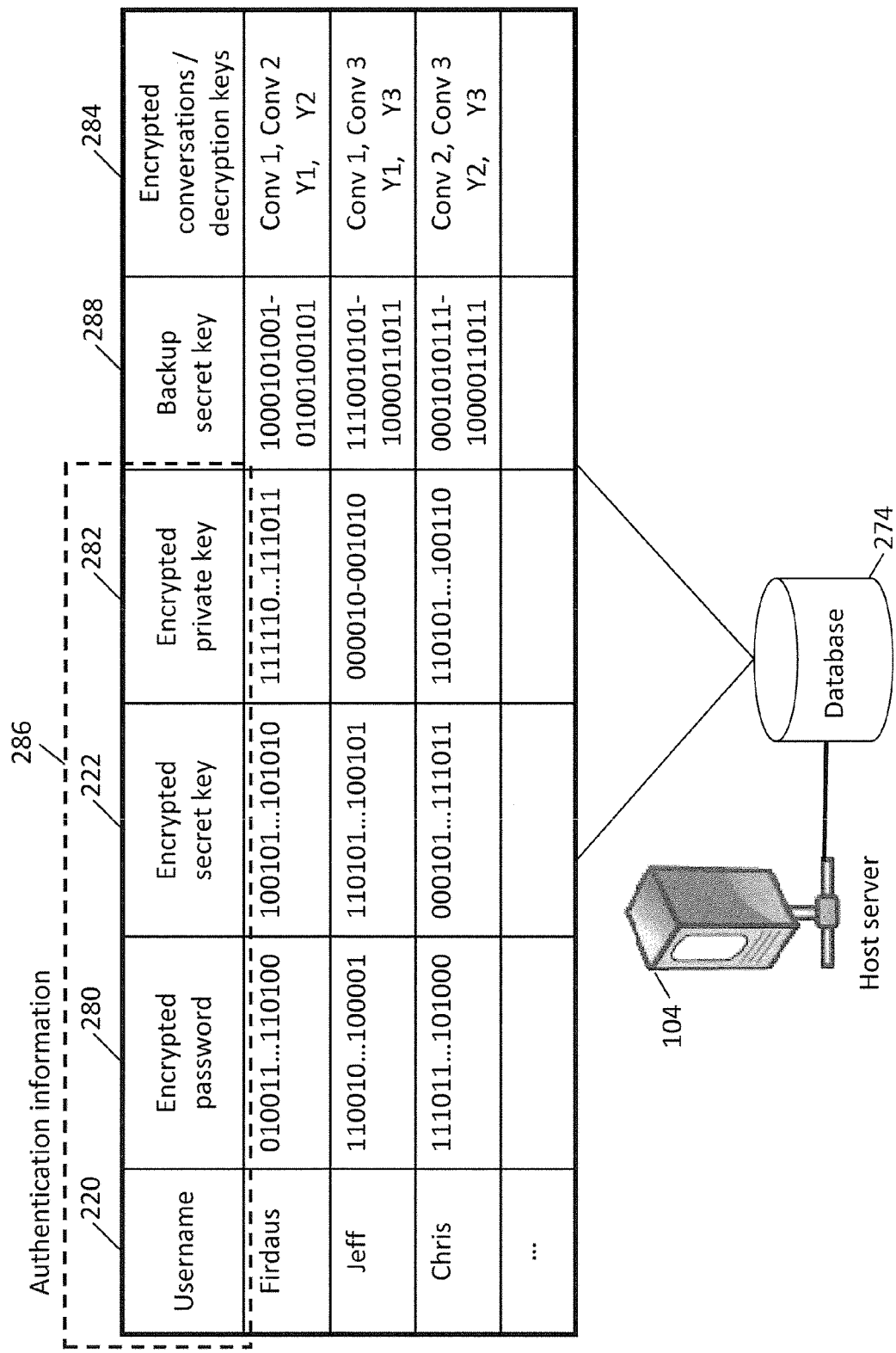
FIG. 11 shows a database in communication with a host server in accordance with certain embodiments of the present invention.

In some cases, a user might misplace the user's password. If a user misplaces the password, the user cannot log onto the data sharing system nor provide authentication bits to retrieve and decrypt the encrypted data stored on the host server. Therefore, the loss of password might result in the loss of user data. To prevent the loss of user data in such events, a preferred embodiment of the data sharing system maintains an encrypted copy of the secret keys at the host server, as shown in FIG. 11. These copies are encrypted with a master public key, which is generated from a powerful encryption method, for instance using the RSA algorithm with a 2048-bit key. The encrypted copy of the secret keys are called the backup secret keys.

Although the backup secret keys are maintained at the host server, encrypted using a master public key, the host server does not have access to the master private key to decrypt the secret key. The master private key is only available at the maintenance server 106. Therefore, if the host server wants to decrypt the backup secret key to retrieve the secret key, the host server has to ask the maintenance server 106 to decrypt the backup secret key. This way, even if a third party attacks the host server 104 and accesses the backup secret key, the third party would not be able to decrypt the backup secret key within a reasonable amount of time.

When a user misplaces the user's password, the user can send a password reset notification to notify the data sharing system that the password is lost and to request that a new password is set for the account. In a preferred embodiment, the user sends the password reset notification to the data sharing system using a client of the data sharing system. To verify that the correct user is requesting the password changes, the data sharing system (e.g., the host server 104) sends a verification request to the user using other communication media associated with the user. The communication media can include an E-mail, a Short Message Service (SMS), and a telephonic communication medium.

Upon verifying the identity of the requester, the host server 104 receives from the client a new password to be associated with the account. In a preferred embodiment, the host server 104 receives the new password in an encrypted form, in a manner similar to steps 144 and 146 of FIG. 3. The host server 104 can also receive from the client the authentication bits associated with the new password. The host server 104 subsequently sends a password reset request to the maintenance server 106. The password reset request includes (1) the username for the account, (2) the backup secret key associated with the account, (3) an access key of the host server, and (4) a response key, which is a AES 256 bit key, that the maintenance server 106 should use to encrypt the response to the password reset request. The access key of the host server is described in more depth with respect to FIG. 9. The password reset request can be encrypted with the master public key that was used to encrypt the backup secret key. This ensures that all the information in the password reset request is protected from a third party and can only be viewed by the maintenance server 106.

When the maintenance server 106 receives the password reset request, the maintenance server 106 first decrypts the password reset request using the master private key. Then the maintenance server 106 verifies the identity of the maintenance server 106 by verifying the access key. When the password reset request passes the verification check, the maintenance server 106 decrypts the backup secret key included in the password reset request using the master private key. The maintenance server 106 then sends the password reset response to the host server 104. The password reset response includes the backup secret key. The password reset response is encrypted using the response key, which was included in the password reset request. When the host server 104 receives the password reset response, it (1) decrypts the password reset response, (2) encrypts the secret key using the new authentication bits, and (3) stores the encrypted secret key in its database. This way, the host server 104 can use the updated secret key for future data access. This completes the password update.

Figure 7:
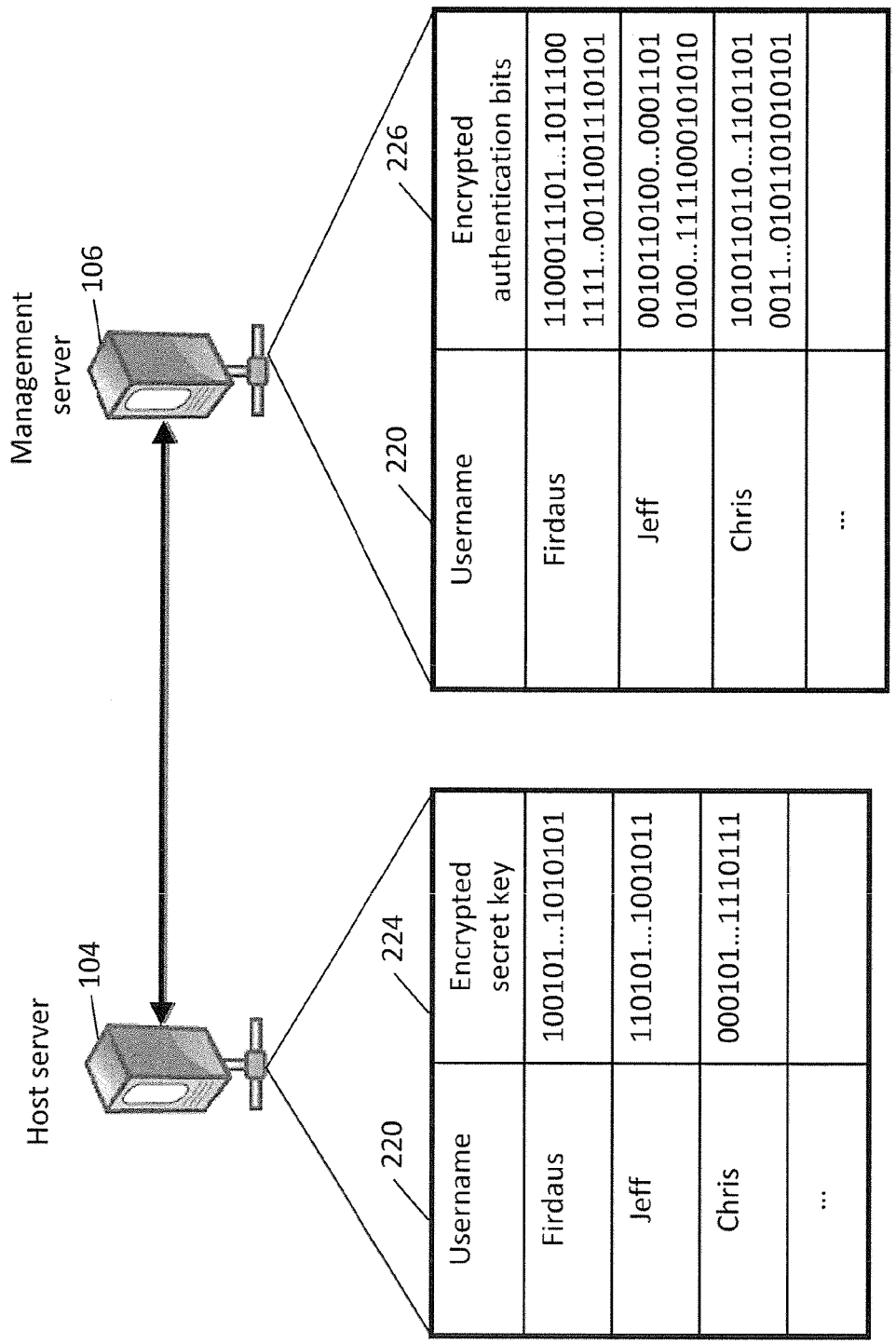
FIG. 7 illustrates how a management server maintains backup authentication bits in accordance with certain embodiments of the present invention.

In another embodiment, the data sharing system stores backup authentication bits 226 at a maintenance server 106, as shown in FIG. 7, as opposed to storing backup secret keys at the host server 104. The backup authentication bits are authentication bits derived from the old password that the user had misplaced. The backup authentication bits 226 in the maintenance server 106 are encrypted using the master public key. As with the preferred embodiment, when a user misplaces the user's password, the user can notify the data sharing system to change the password to the new password specified by the user.

Upon verifying the identity of the requester, as in the preferred embodiment, the host server 104 receives a new password for the account and sends a password reset request to the maintenance server 106. The password reset request includes (1) the username for the account, (2) the account's new authentication bits, derived from the new password, (3) the secret key encrypted with the old authentication bits (i.e., associated with the old password which is no-longer known), (4) the access key of the host server, and (5) the AES 256 bit key that the maintenance server 106 should use to encrypt the response to the password reset request. As with the preferred embodiment, the password reset request is encrypted with a master public key that only the maintenance server 106 can decrypt.

When the maintenance server 106 receives the password reset request, the maintenance server 106 first verifies the identity of the maintenance server 106 by verifying the access key. When the password reset request passes the verification check, the maintenance server 106 decrypts the encrypted, backup authentication bits using the master private key. Then, the maintenance server 106 decrypts the encrypted secret key received from the host server using the decrypted backup authentication bits. Subsequently, the maintenance server 106 re-encrypts the decrypted secret key using the new authentication bits received from the host server 104, and sends to the host server 104 a password reset response, which includes the re-encrypted secret key. As in the preferred embodiment, the password reset response is encrypted using the AES 256 bit key that was included in the password reset request. When the host server 104 receives the password reset response, it decrypts the password reset response and stores the encrypted secret key received from the maintenance server 106. This way, the host server 104 can use the updated secret key for future data access. In the meanwhile, the maintenance server 106 also updates the backup authentication bits for the account. The maintenance server 106 encrypts the new authentication bits using the master public key, and stores the encrypted authentication bits in its storage as a backup.

In some cases, a user can communicate with the host server 104 using multiple clients running on different computing devices. Also, multiple users can time-share a single client to access the data sharing system. In certain embodiments, when an existing user accesses a client for the first time, the client is registered with the host server 104. The registration serves two purposes: (1) guard against third party security breaches and (2) provide the client with the user's private key.

Figure 8:
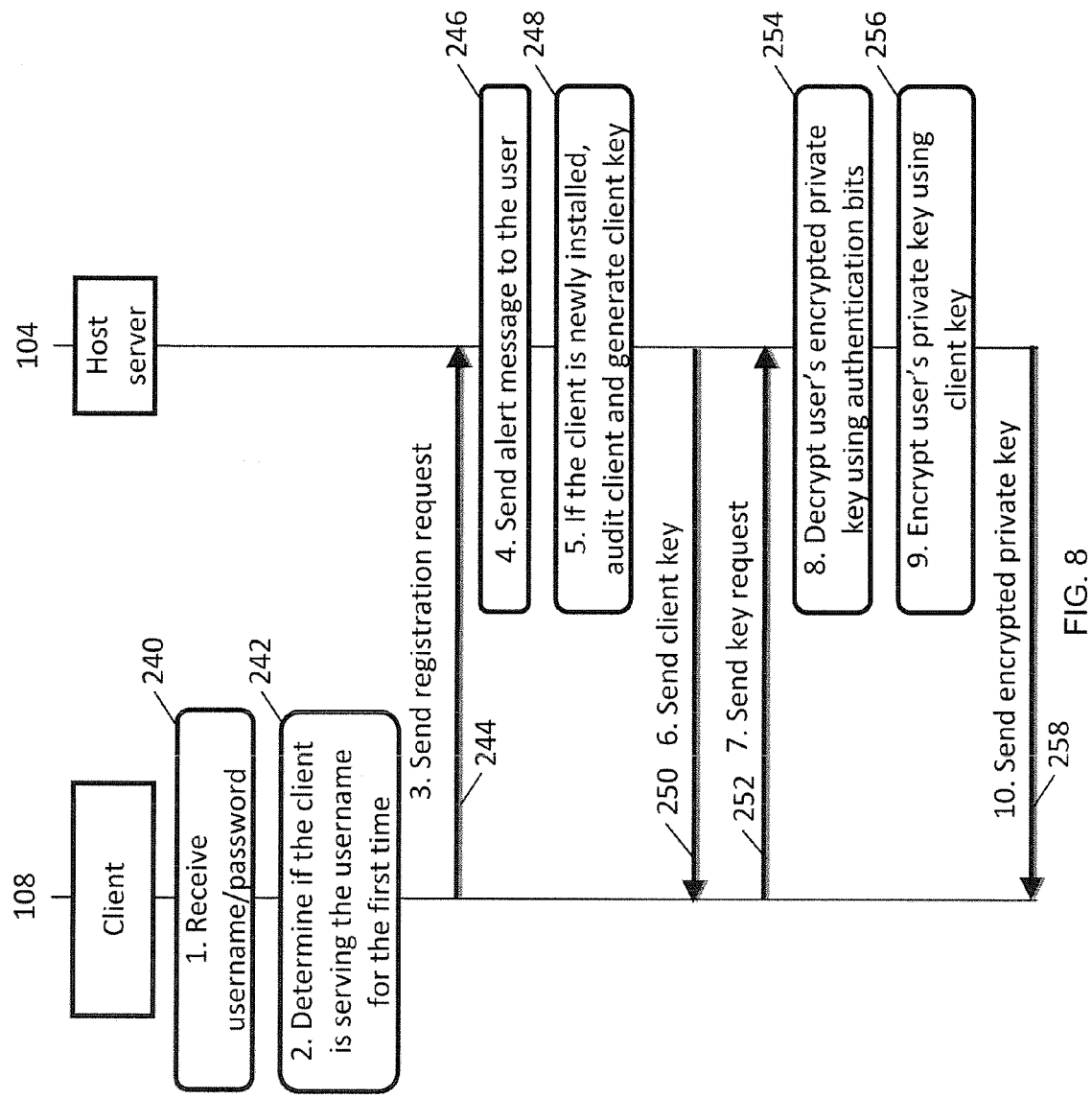
FIG. 8 illustrates a flow of messages illustrating how a host server registers a user operating at a client in accordance with certain embodiment of the present invention.

FIG. 8 illustrates, in accordance with certain embodiments of the present invention, how a host server registers a client serving a user for the first time. In step 240, a client receives a username and a password from a user. In step 242, the client determines whether the client has served this user before. In one embodiment, the client makes this decision by maintaining a user database. The user database maintains a list of users that the client has ever served. Therefore, if the client cannot find the received username in its user database, then the client knows that the client has never served this user before. In another embodiment, the client scans its database of public/private keys, and if the client does not have public/private keys for the received username, then the client knows that the client has never served this user before. If the client is serving the user for the first time, the client initiates a registration process with the host server.

In step 244, the client sends a registration request to the server. In a preferred embodiment, the registration request includes at least (1) the username, (2) the encrypted password, and (3) authentication bits. The password is encrypted using a method described in relation to FIG. 3.

In step 246, the host server 104 tries to authenticate the user and if the host server is able to authenticate the user based on the authentication information stored on its database, the host server sends an alert message to the user. The alert message can be in the form of a conversation in the data sharing system, an electronic mail, a short message service (SMS) message to the user's cell phone, or a phone call. The alert message notifies the user that the user accessed the data sharing system using a new client. If the user did not access the data sharing system using a new client, then the user knows that the user's account has been breached by a third party. In this case, the user can notify the system administrator to change the user's password or to disable the registered client from accessing the user's information. In some embodiments, the alert message is part of a verification message. The verification message includes a code that the user should provide to the data sharing system in order to proceed with the registration process. Such a verification step introduces a physical item to the client registration, which can further reduce security risks.

In step 248, the host server determines if the client is newly installed and is being used, by the user that is currently logged-in, for the first time. If so, the host server audits the client-related information and stores the client-related information in a database. The client-related information includes the client's IP address. Then the host server generates a client key. In a preferred embodiment, the client key is an 256-bit AES key. However, the client key can be any other types of encryption keys. In a preferred embodiment, the host server generates a unique client key for each unique user on each machine, encrypts the client key using the user's secret key, and maintains the encrypted client key in its database. Because the client key is unique for each user on each machine, a single machine can maintain multiple client keys, each corresponding to different users. In step 250, if the host server generated the client key, the host server sends the client key to the client. This way, the host server can use the client key to encrypt information sent to the client, especially when the host server does not have the user's public key.

In step 252, the client sends a key request to the host server in order to retrieve the account's X.509 public key/encrypted private key. In step 254, the host server decrypts the user's private key using the user's authentication bits. This step includes (1) decrypting the user's secret key using the authentication bits and (2) decrypting the private key using the decrypted secret key. The details of this step are similar to relevant steps of FIG. 5. In step 256, the host server encrypts the user's private key using the client key, and in step 258, the host server sends the encrypted private key to the client over a secure communication channel. As a last step, the host server encrypts the client key using the user's secret key (retrieved in step 254) and stores the encrypted client key in its database. This completes the client registration process. Although FIG. 8 illustrates the client key as a symmetric encryption key, one skilled in the art can modify the steps illustrated in FIG. 8 to accommodate a client key for an asymmetric encryption method.

Host Server Architecture

Figure 9:
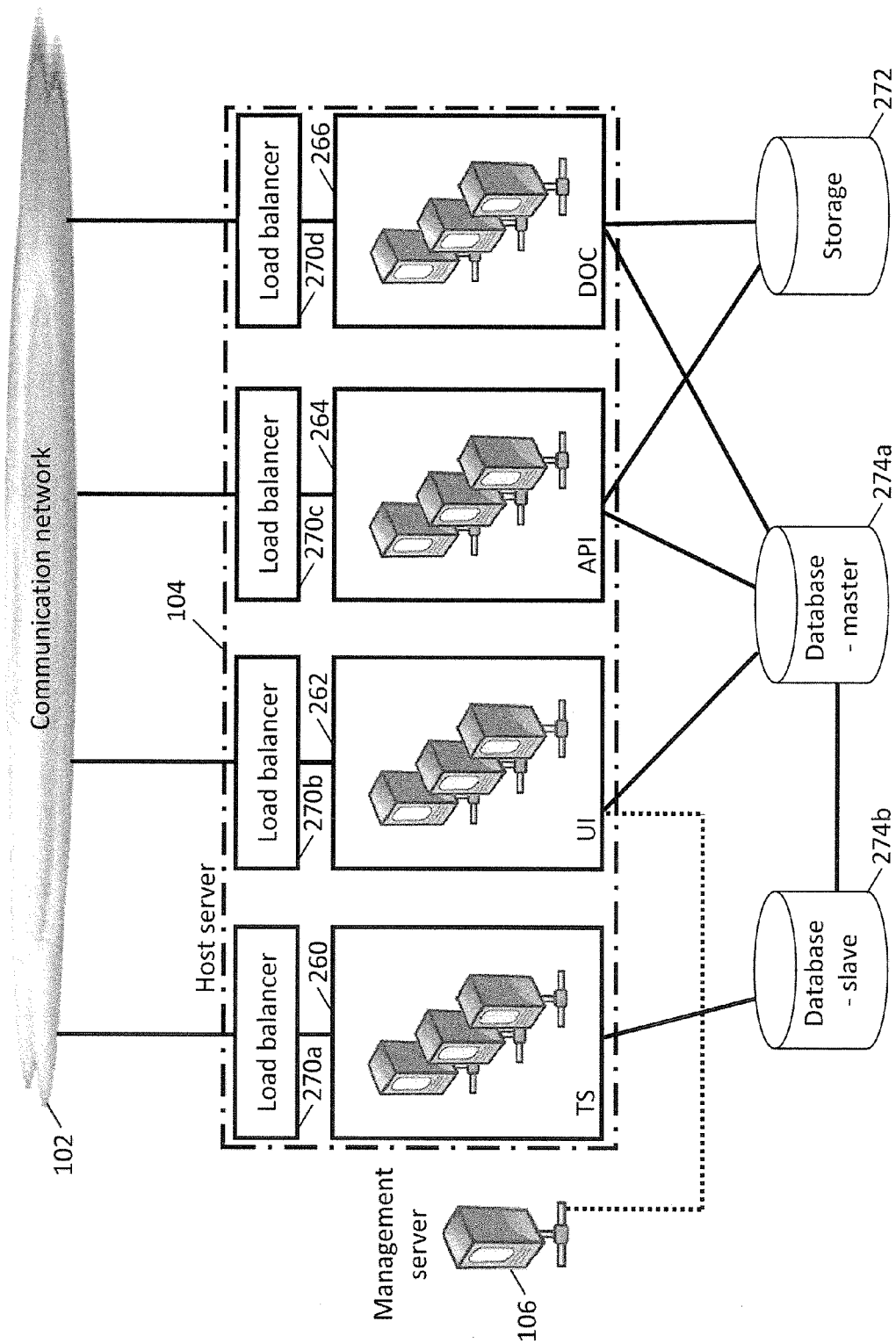
FIG. 9 illustrates a server system architecture in accordance with certain embodiments of the present invention.

In certain embodiments, a host server 104 includes a plurality of server groups, each performing dedicated functions. FIG. 9 illustrates a host server architecture in accordance with certain embodiments of the present invention. A host server 104 includes a timestamp server group (T-S) 260, a user interface server group (UI-S) 262, an application programming interface server group (API-S) 264, and a document server group (DOC-S) 266, and each of these server groups communicates with a master database 274a, a slave database 274b, and a storage device 272. The host server 104 communicates with a management server 106 as well as other devices over a communication network 102. The host server 104 is decomposed into distinct server groups based on the type of data handled by the groups. In one embodiment, each server group is implemented as a software module on a single server. In another embodiment, each server group is implemented using at least one server. If a server group has more than one server, the server group includes load balancer 270a-d, which is capable of distributing work load among servers within the same server group.

In some embodiments, the T-S 260 manages timestamp information of all the conversations hosted by the host server 104. When a client communicates with the host server 104 to send a timestamp request message and receive a timestamp request response, as illustrated the preferred embodiment of FIG. 6, it is the T-S 260 that serves the client. The API-S 264 serves the clients. The API-S 264 hosts conversation requests, manages messages in conversations, and responds to application programming interface calls received from the clients. When a client communicates with the host server 104 to send a timestamp profile request and receive a timestamp profile response, as illustrated the preferred embodiment of FIG. 6, it is the API-S 264 that serves the client.

The DOC-S 266 communicates with clients to receive document files from clients and send document files to clients. The DOC-S 266 is dedicated to providing client-server interactions that demand high bandwidth usage. The UI-S 262 is responsible for providing administrative services and management services to users. For example, the UI-S 262 handles account creation, registration processes, and any type of information presented to the users including web pages and log-in modules. The UI-S 262 also communicates with the management server 106 to provide services related to backup secret keys or backup authentication bits.

In a preferred embodiment, the server groups cooperates with one another to provide an integrated service to users. For example, if the T-S 260 recognizes that a new document has been added to the conversation, the T-S 260 notifies the clients to download the new document from the DOC-S 266; if the T-S 260 recognizes that a new message has been added to the conversation, the T-S 260 notifies the clients to download the new message from the API-S 264.

The host server architecture of FIG. 9 provides a scalable platform for service providers. As the number of clients using the host server increases, the service provider can increase the capacity of the host server 104 by increasing the number of servers per server groups. In some embodiments, the host server 104 maintains scaling criteria for controlling the number of servers dedicated to a server group. The scaling criteria depends on (1) bandwidth usage on network adaptors and (2) the amount of work load on the central processing units (CPU.) The host server 104 can be configured to monitor itself to determine if a server group needs more servers. In other embodiments, an external management system maintains and detects criteria for increasing the number of servers in a server group. In some embodiments, if the service provider decides to provide more functionalities to the clients and if the service provider decides to provide dedicated servers for those functionalities, the service provider can (1) add a new server group to the host server 104 or (2) divide an existing server group into two or more server groups. Because server groups communicate with one another using a communication protocol, as long as the new server groups accommodate the communication protocol, the addition of new server groups is transparent to existing server groups. In a preferred embodiment, the host server runs in a cloud computing environment, for example, Amazon Web Service (AWS).

Figure 10:
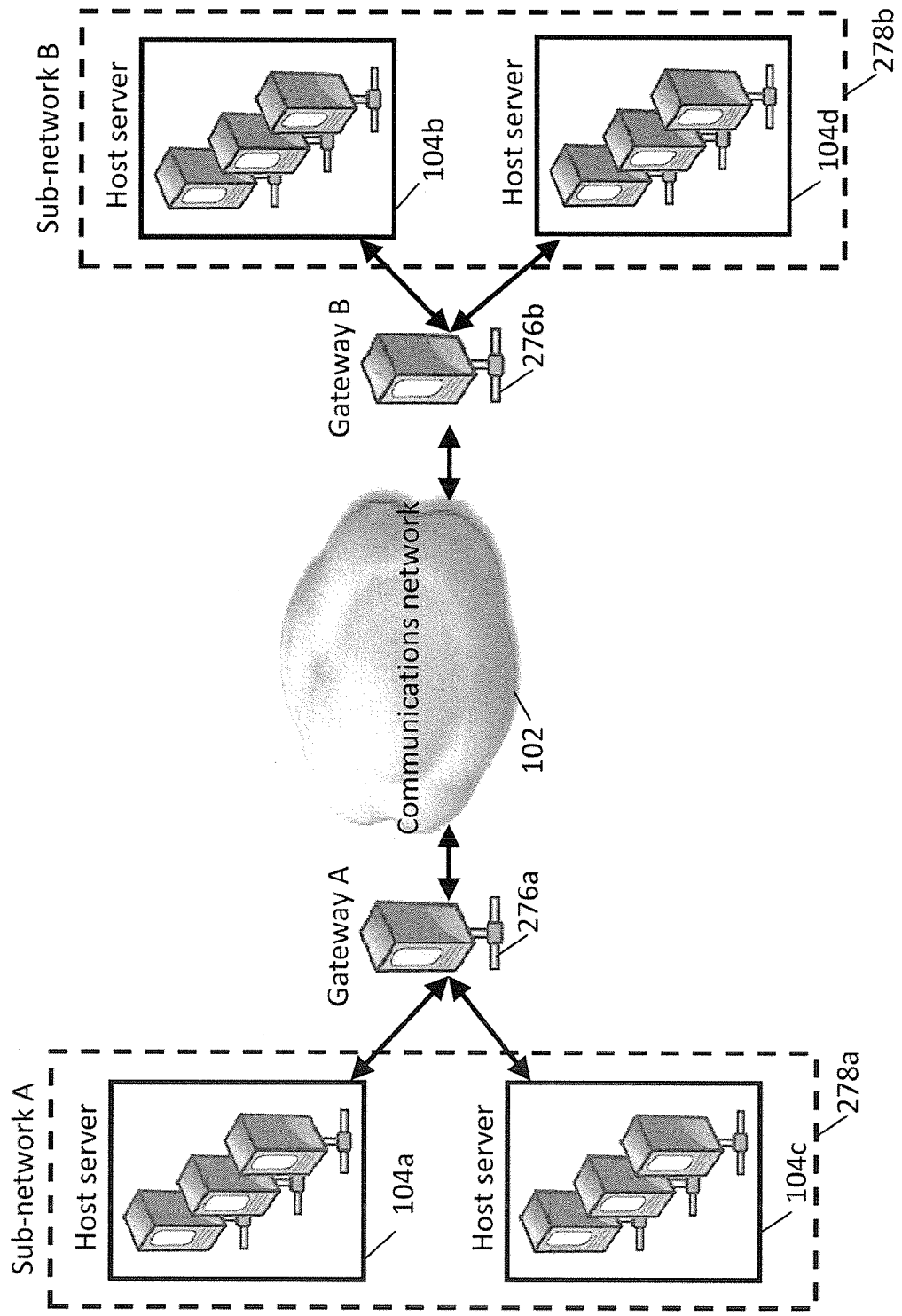
FIG. 10 shows a communication system implementing a secure data sharing system in a large-scale communications network in accordance with certain embodiments of the present invention.

The host server architecture is easily scalable to accommodate communication across a large-scale communication network using gateway services. FIG. 10 illustrates an embodiment in which each host server resides in a sub-network such as a local area network (LAN) and the host servers communicate across sub-networks through gateways. Communications between the gateways follow a secure protocol. Prior to communication, gateways negotiate a special key to be included in all communications between the gateways. This way, gateways can identify whether a message was sent from a secure source or not.

In one embodiment, each host server can maintain, in its database, the location and the public key of every user using the data sharing system. This database keeps track of all registered users in the data sharing system. When client A in sub-network A 278a initiates a conversation with client B in sub-network B 278b, client A sends an encrypted version of the conversation to the host server 104a, as illustrated in relation to FIG. 4. The encrypted conversation includes (1) documents and messages encrypted using an encryption key X and (2) the decryption key Y paired with the encryption key X. The decryption key Y in the conversation is encrypted using the public key of client A. Upon receiving the encrypted conversation, the host server 104a decrypts the encrypted decryption key using the private key of client A and re-encrypts the decryption key using the public key of client B. This operation is illustrated in relation to steps 180-188 of FIG. 5.

Subsequently, the host server 104a routes the encrypted conversation to Gateway A 276a. Gateway A 276a then relays the encrypted conversation and the previously negotiated special key to Gateway B 276b that interfaces the sub-network B 278b. Upon verifying that the message from Gateway A 276a includes the special key, Gateway B 276b relays the encrypted conversation to the host server 104b that serves client B. The host server 104b then relays the encrypted conversation to client B. Client B uses its private key to decrypt the encrypted decryption key, and uses the decrypted decryption key to decrypt the encrypted documents and messages, thereby securely completing the communication between client A and client B over a large-scale communication network.

In another embodiment, each gateway and each host server has its own X.509 public/private key. In this embodiment, a host server does not maintain the public key of every user using the data sharing system. Instead, a host server maintains the public key of all gateway associated with itself, and each gateway maintains the public key of all host servers associated with itself and all gateways residing in the communication network. When client A in sub-network A 278a initiates a conversation with client B in sub-network B 278b, client A sends an encrypted version of the conversation to the host server 104a, as illustrated in relation to FIG. 4. The encrypted conversation includes (1) documents and messages encrypted using an encryption key X and (2) the decryption key Y paired with the encryption key X. The decryption key Y in the conversation is encrypted using the public key of client A. Upon receiving the encrypted conversation, the host server 104a decrypts the encrypted decryption key using the private key of client A, as illustrated in relation to steps 180-186 of FIG. 5.

Subsequently, the host server 104a re-encrypts the decryption key using the public key of Gateway A 276a and routes the encrypted conversation to Gateway A 276a. Upon receiving the encrypted conversation, Gateway A 276a decrypts the encrypted decryption key using its private key and re-encrypts the decryption key using the public key of Gateway B 276b. Gateway A 276a transmits the encrypted conversation and the negotiated special key to Gateway B 276b that interfaces the sub-network B 278b. After verifying that the message from Gateway A 276a includes the special key, Gateway B 276b (1) decrypts the encrypted decryption key using its private key, (2) re-encrypts the decryption key using the public key of the host server 104b that serves client B, and (3) transmits the encrypted conversation to the host server 104b. The host server 104b then (1) decrypts the encrypted decryption key using its private key, (2) re-encrypts the decryption key using the public key of client B, and (3) transmits the encrypted conversation to client B. Client B uses its private key to decrypt the encrypted decryption key, and uses the decrypted decryption key to decrypt the encrypted documents and messages, thereby securely completing the communication between client A and client B over a large-scale communication network.

The host server 104 can communicate with a management server 106 to change password for users, as illustrated in FIG. 7. The communication between the host server 104 and the management server 106 follows a communication protocol. Under this protocol, a request from the host server 104 to the management server 106 includes an access key. The access key is a signature that the server requesting service from the management server 106 is authorized to request the service. This protects a third party from requesting service from the management server 106. In a preferred embodiment, the access key is an AES 256 key, but other types of encryption/decryption keys can be used. The access key is maintained in an encrypted form, in the database 274 or in the storage 272. The encrypted access key is decrypted only at the boot-up of the host server 104. In a preferred embodiment, the decryption key for the encrypted access key is provided from a management system, which is illustrated in detail in FIG. 12. Once the encrypted access key is decrypted, the access key is maintained at the host server 104. As is the case with the secret key, the access key is entirely internal to the host server 104, and is not visible or accessible from the network. In other words, there are no application programming interface (API) functions or instructions to request the access key from an external device. Therefore, the access key is completely transparent to conversation participants and a third party.

In a preferred embodiment, the server groups communicate with one or more of the following to access service-related information: a master database 274a, a slave database 274b, and a storage device 272. The databases 274 and/or the storage device 272 can reside in the host server 104 or reside in an external device. The storage device 272 maintains all the information stored on the host server 104, including conversations, authentication information, private keys, secret keys, client keys etc. The storage device 272 is implemented on a computer readable medium. In a preferred embodiment, the storage device 272 is hosted on Amazon Simple Storage Service (Amazon S3). The database 274 is also implemented on a computer readable medium. In a preferred embodiment, the database 274 is a cache of the storage device 272: the database 274 maintains a copy of the information stored in the storage device 272 for fast information retrieval. The database 274 includes users' authentication information and users' conversations.

FIG. 11 illustrates, in accordance with certain embodiments, the information stored in the database 274. The database maintains authentication information 286 as well as conversation-related information for each user. The authentication information 286 includes (1) the username 220, (2) the encrypted password 280, (3) the encrypted secret key 222, and (4) the encrypted private key 282. The database can also include the backup secret key 288, which is used to recover the data when the user misplaces the password. Apart from the username 128, all the information in the database 274 is encrypted so that the information is protected from a third party accessing the database. In a preferred embodiment, the database 274 is implemented using a database management system. The database management system includes MySQL, PostgreSQL, Microsoft Access, SQL Server, FileMaker, Oracle, Sybase, dBASE, Clipper, and FoxPro.

In certain embodiments, the host server 104 manages a digital signature of data stored on the storage device 272. If a third party modifies the digitally signed data, the third party modifies the digital signature on the data at the same time. Therefore, when the host server 104 reads the stored data, the host server 104 can identify whether the data have been modified by a third party. When the host server 104 detects that a third party has modified the stored data, the host server 104 notifies the system administrator and returns an error to the client so that the modified data are not used by the client.

In some embodiments, a server in the server groups is configured by executing configuration procedures using a configuration file. For example, when a server is booted up, the server can use information in a configuration file to configure initial settings of the server environment. The configuration file includes credential information for providing access to the storage device of FIG. 9. In a preferred embodiment, the configuration file is implemented using an extensible markup language (XML). However, other types of configuration files can be used, including YAML or a system-specific format such as a dotfile for UNIX and INI file for Windows and IBM OS/2.

In a preferred embodiment, the host server 104 maintains its configuration information in a list of key-value pairs stored in a property file and generates a configuration file from the property file using a configuration file template. This process involves (1) mapping each parameter in the configuration file template to one of the keys in the property file and (2) substituting each parameter in the configuration file using the value paired with the mapped key. For enhanced security, a key-value pair in the property file is encrypted, in which case the key-value pair is tagged as such. For example, the encrypted key-value pair is represented with a key starting with a positive value or by a key tagged with a "+" sign. To further reduce the security risk, the host server 104 might not maintain the decryption key for the encrypted key-value pair. Therefore, even if a third party attacks the server and gains access to the property file, the third party cannot read the configuration information in the property file, which includes the credential information to access data in the storage device.

Figure 12:
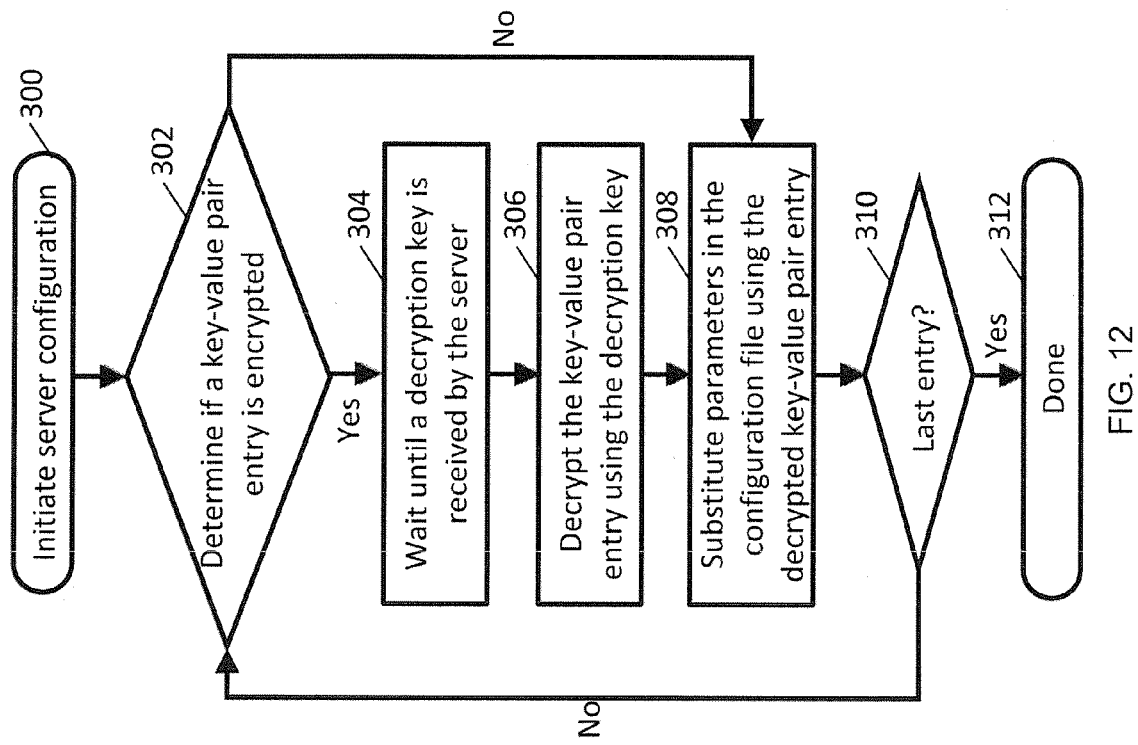
FIG. 12 illustrates how a server securely configures its environment in accordance with certain embodiments of the present invention.

FIG. 12 illustrates, in accordance with certain embodiments of the present invention, how a host server 104 uses encrypted key-value pairs in a property file to configure itself. In step 300, the host server 104 initiates the server configuration procedure. The server configuration procedure includes (1) generating a configuration file from the property file and (2) executing the generated configuration file. Before generating the configuration file from the property file, encrypted key-value pair entries in the property file are decrypted. In step 302, the host server 104 reads a key-value pair from the property file and determines if the selected key-value pair is encrypted. The host server 104 determines if a key-value pair is encrypted by analyzing the tag on the key-value pair. If the selected key-value pair is not encrypted, then the host server 104 proceeds to step 308; if the selected key-value pair is encrypted, the host server 104 proceeds to step 304.

In step 304, the host server 104 sends a decryption key request to the management system in order to receive the decryption key for the encrypted key-value pair. The management system is aware of which host servers are in the key request state to send the decryption key request. The management system would provide the decryption key only to the host server 104 in the key request state, but reject decryption key requests from any other host servers not in the key request state. In a preferred embodiment, the management system communicates with the host server 104 over a local network connection (i.e., via a domain socket or loopback, but not over a network) so that a third party cannot snoop on the decryption key request/response between the management system and the host server 104. In some embodiments, the decryption key request includes the key of the encrypted key-value pair to identify the key-value pair to the management system. The host server 104 then waits until the host server 104 receives the decryption key from the management system.

In step 306, the host server 104 receives the decryption key for the key-value pair and decrypts the key-value pair. After the decryption, the host server 104 erases the decryption key so that the decryption key does not remain in the host server 104. In step 308, the host server 104 (1) finds the parameter in the configuration file template that is mapped to the key in the key-value pair and (2) substitutes the parameter using the value paired with the mapped key. In step 310, the host server 104 checks whether there are any remaining key-value pairs that should be substituted into the configuration file, and repeats steps 302-308 until all the key-value pairs in the property file have been substituted into the configuration file. In step 312, the host server 104 executes the generated configuration file. Once the host server 104 completes the configuration, the host server 104 erases the configuration file for security.

Figure 13:
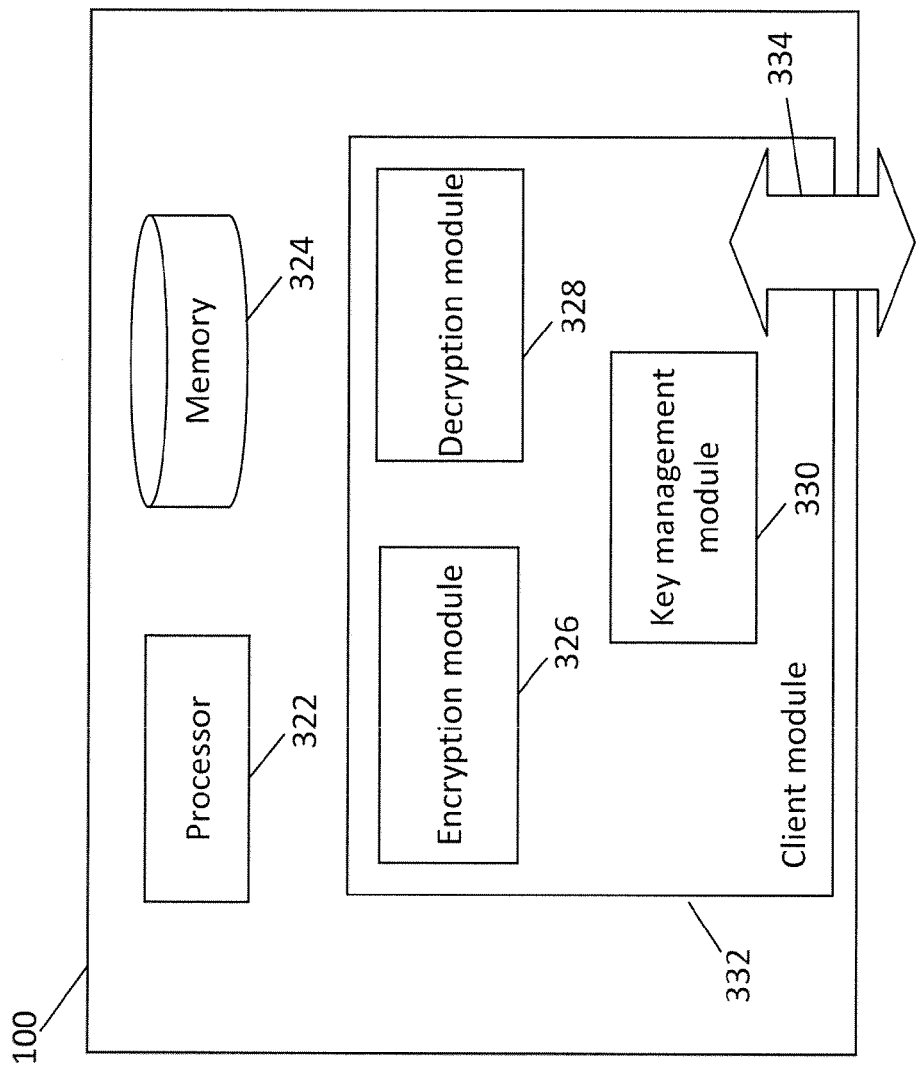
FIG. 13 illustrates a logical diagram of a computing device in accordance with certain embodiments of the present invention.

FIG. 13 illustrates a logical view of a computing device running a client in accordance with certain embodiments of the present invention. The computing device 100 includes a processor 322, a memory 324, a client module 332, and an interface 334. The client module 332 further includes an encryption module 326, a decryption module 328, and a key management module 330.

An encryption module 326 encrypts user credential information, conversation, and other private information before they are sent to other devices, including a host server. The encryption module 326 encrypts a user password using a salt value and a key derivation function or using other known encryption methods; the encryption module 326 generates authentication bits from the user password using a salt value and a key derivation function or using other known encryption methods; and the encryption module 326 encrypts conversation information using a symmetric or an asymmetric encryption method.

A decryption module 328 decrypts encrypted information using a decryption key. The encrypted information includes an encrypted conversation and an encrypted private key. The decryption module 328 can use a decryption key received over an interface 334 or a decryption key that is maintained by the computing device 100 at a key management module 330.

A key management module 330 maintains encryption keys and decryption keys for users of the computing device 100. These keys include at least (1) public/private keys and (2) salt values for authentication purposes. The key management module 330 also maintains client specific key information, including a client key. In some cases, the key management module 330 can include as a database, which may be stored in a memory 324.

The encryption module 326, the decryption module 328, and the key management module 330 comprise a client module 332. The client module 332 is implemented in software, which may be stored in a memory 324. The memory 324 can be a computer readable medium, a programmable read only memory (PROM), or flash memory. The software runs on a processor 322 capable of executing computer instructions or computer code. The client module 332 might also be implemented in hardware using an application specific integrated circuit (ASIC), programmable logic array (PLA), field programmable gate array (FPGA), or any other integrated circuit.

An interface 334 provides an input and/or output mechanism to communicate over a network. The interface 334 enables communication with servers, as well as other core network nodes to send and receive data. The interface 334 is implemented in hardware to send and receive signals in a variety of mediums, such as optical, copper, and wireless, and in a number of different protocols some of which may be non-transient.

The computing device 100 can be a long term evolution (LTE) user equipment. The user equipment 100 communicates with one or more radio access networks and with wired communication networks. The user equipment 100 can be a cellular phone having phonetic communication capabilities. The user equipment 100 can also be a smart phone providing services such as word processing, web browsing, gaming, e-book capabilities, an operating system, and a full keyboard. The user equipment 100 can also be a tablet computer providing network access and most of the services provided by a smart phone. The user equipment 100 operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment 100 can also keep global positioning coordinates, profile information, or other location information.

The computing device 100 also includes any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. The computing device 100 can have a memory such as a computer readable medium, flash memory, a magnetic disk drive, an optical drive, a programmable read-only memory (PROM), and/or a read-only memory (ROM). The computing device 100 is configured with one or more processors 322 that process instructions and run software that may be stored in memory. The processor 322 also communicates with the memory and interfaces to communicate with other devices. The processor 322 can be any applicable processor such as a system-on-a-chip that combines a CPU, an application processor, and flash memory. The computing device 100 can also provide a variety of user interfaces such as a keyboard, a touch screen, a trackball, a touch pad, and/or a mouse. The computing device 100 may also include speakers and a display device in some embodiments.

Figure 14:
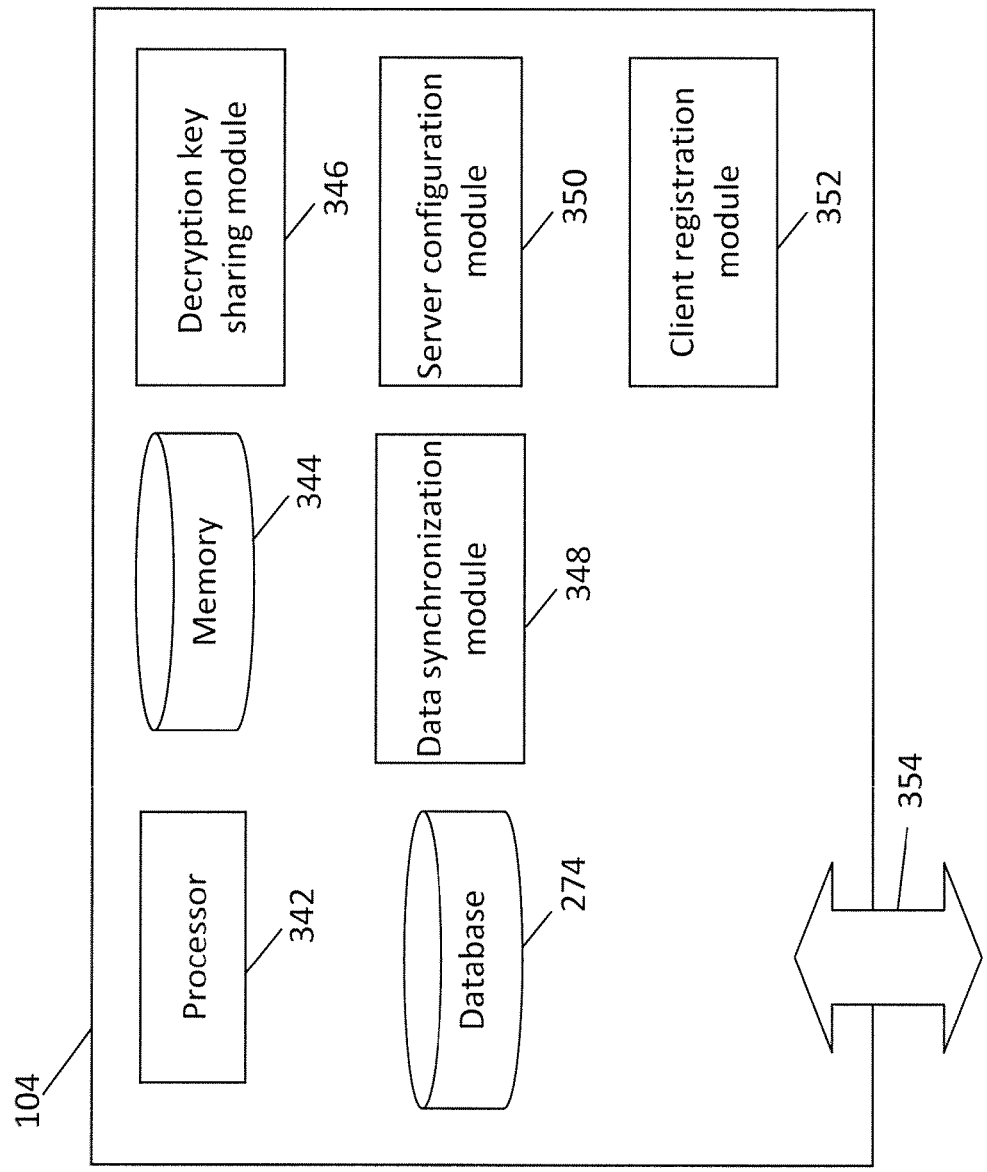
FIG. 14 illustrates a logical diagram of a host server in accordance with certain embodiments of the present invention.

FIG. 14 illustrates a logical view of a host server 104 in accordance with certain embodiments. The host server 104 includes a processor 342, a memory 344, an interface 354, a database 274, a decryption key sharing module 346, a data synchronization module 348, a server configuration module 350, and a client registration module 352.

A decryption key sharing module 346 processes an encrypted decryption key to transform the encrypted decryption key into a form that a conversation participant can decrypt. The transformation involves decrypting the encrypted decryption key using a private key of a conversation initiator and re-encrypting the decryption key using a public key of a conversation participant.

A data synchronization module 348 maintains a timestamp for data maintained by the host server. When a client sends a timestamp request message associated with a conversation, the data synchronization module 348 sends the maximum timestamp value for each object type in the conversation. When the client sends a timestamp profile request for a particular object type in the conversation, the data synchronization module 348 sends a timestamp profile response that describes the changes made to the specified object type. When the client requests updated information, the data synchronization module 348 initiates data synchronization by sending the updated information to the client.

A server configuration module 350 securely configures the host server 104 using a property file. The configuration module 350 extracts key-value pairs from the property file, decrypts the key-value pairs as applicable, and substitutes parameters in a configuration file template with the values in the key-value pairs to generate a valid configuration file. The configuration module 350 executes the configure procedure using the generated configuration file.

A client registration module 352 registers a client to the data sharing system. The registration process can be triggered by a client serving a new user or a newly installed client. The registration module 352 generates a client key that is unique to each client. The client key is used to encrypt public/private key associated with the user at the client, which is subsequently sent to the client over an interface. The registration module 352 audits client-related information and stores the client-related information in the database 274.

The decryption key sharing module 346, the data synchronization module 348, the server configuration module 350, and the client registration module 352 are implemented in software, which is stored in a memory 344. The memory 344 includes a computer readable medium, a programmable read only memory (PROM), or flash memory. The software runs on a processor 302 capable of executing computer instructions or computer code. These modules might also be implemented in hardware using an application specific integrated circuit (ASIC), programmable logic array (PLA), field programmable gate array (FPGA), or any other integrated circuit.

An interface 354 provides an input and/or output mechanism to communicate over a network. The interface 354 enables communication with servers, as well as other core network nodes to send and receive data. The interface 354 is implemented in hardware to send and receive signals in a variety of mediums, such as optical, copper, and wireless, and in a number of different protocols some of which may be non-transient.

The host server 104 operates using an operating system (OS) software. In a preferred embodiment, the OS software is based on a Linux software kernel and runs specific applications in the host server such as monitoring tasks and providing protocol stacks. The OS software allows host server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources are dynamically deployed to meet the requirements in some embodiments.

The host server's software is divided into a series of tasks that perform specific functions. These tasks communicate with each other as needed to share control and data information throughout the host server 104. A task is a software process that performs a specific function related to system control or session processing. Three types of tasks operate within the host server 104 in some embodiments: critical tasks, controller tasks, and manager tasks. The critical tasks control functions that relate to the host server's ability to process calls such as host server initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards are divided into subsystems. A subsystem is a software element that either performs a specific task or is a culmination of multiple other tasks. A single subsystem includes critical tasks, controller tasks, and manager tasks. Some of the subsystems that run on the host server 104 include a system initiation task subsystem, a high availability task subsystem, a shared configuration task subsystem, and a resource management subsystem.

The system initiation task subsystem is responsible for starting a set of initial tasks at system startup and providing individual tasks as needed. The high availability task subsystem works in conjunction with the recovery control task subsystem to maintain the operational state of the host server 104 by monitoring the various software and hardware components of the host server 104. Recovery control task subsystem is responsible for executing a recovery action for failures that occur in the host server 104 and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

Shared configuration task subsystem provides the host server 104 with an ability to set, retrieve, and receive notification of host server 104 configuration parameter changes and is responsible for storing configuration data for the applications running within the host server 104. A resource management subsystem is responsible for assigning resources (e.g., processor and memory capabilities) to tasks and for monitoring the task's use of the resources.

In a preferred embodiment, the host server 104 resides in a data center and forms a node in a cloud computing infrastructure. The host server 104 provides services on demand. A module hosting a client is capable of migrating from one host server to another host server seamlessly, without causing any program faults or system breakdown. The host server 104 on the cloud can be managed using a management system, which can include the Rightscale Cloud Management Platform provided by Rightscale, Inc.

In some embodiments, cryptography methods are used to encrypt and decrypt information. The cryptography method can include the RSA algorithm, the Data Encryption Standards (DES), the triple-DES, the Advanced Encryption Standard (AES), the blowfish algorithm, the International Data Encryption Algorithm (IDEA), the Software-optimized Encryption Algorithm (SEAL), the Message Digest algorithms, and the RC4 algorithm.

In some embodiments, the software needed for implementing a process or a database includes a high level procedural or an object-orientated language such as C, C++, C#, Java, or Perl. The software may also be implemented in assembly language if desired. The language can be a compiled or an interpreted language. Packet processing implemented in a host server includes any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the server groups in the host server can each be a logical module running on a single server.

We claim:

1. A communication method comprising:
    receiving from a first client a communication request that includes an encrypted conversation, a first key, and authentication bits, the communication request requesting that a host server sends the encrypted conversation and a decryption key for the encrypted conversation to a second client, wherein the first key is the decryption key that has been encrypted using a first public key associated with a first user at the first client;
    in order to retrieve the decryption key from the first key,
        retrieving, at the host server, an encrypted secret key associated with the first user;
        decrypting the encrypted secret key using the authentication bits included in the communication request received from the first user, thereby retrieving a secret key associated with the first user;
        retrieving, at the host server, an encrypted private key associated with the first user;
        decrypting the encrypted private key using the secret key associated with the first user, thereby retrieving a private key associated with the first user;
        decrypting the first key using the private key associated with the first user, thereby retrieving the decryption key;
    encrypting the decryption key using a second public key associated with a second user at the second client to generate a second key; and
    sending to the second client the encrypted conversation and the second key;
    receiving, from the first client, a password reset notification notifying that a password associated with the first user is lost;
    receiving new authentication bits derived from a new password to be associated with the first user;
    retrieving a backup secret key associated with the first user, wherein the backup secret key is encrypted using a master public key;
    sending a password reset request to a management server that maintains a master private key paired with the master public key, wherein the password reset request includes the backup secret key;
    receiving from the management server a password reset response that includes the secret key associated with the first user;
    encrypting the secret key using the new authentication bits; and
    storing the secret key encrypted using the new authentication bits.

2. The communication method of claim 1, further comprising:
    receiving, at the second client, the encrypted conversation and the second key;
    decrypting, at the second client, the second key using a second private key associated with the second client, thereby retrieving the decryption key for the encrypted conversation; and
    decrypting the encrypted conversation using the decrypted second key.

3. The communication method of claim 1, wherein the encrypted conversation includes an encrypted message and an encrypted document, each encrypted using a unique encryption key.

4. The communication method of claim 1, wherein the authentication bits are derived from a password associated with the first user.

5. The communication method of claim 1, wherein the secret key is an Advanced Encryption Standard (AES) key.

6. The communication method of claim 1, wherein the password reset request includes an access key that notifies the maintenance server that the host server is authorized to send the password reset request to the maintenance server.

7. The communication method of claim 1, wherein the password reset request further includes a response key that will be used by the management server to encrypt the password reset response.

8. The communication method of claim 1, further comprising:
    receiving a timestamp request message from the first client, the timestamp request message requesting a maximum timestamp value for each object type in the conversation; and
    sending a timestamp response message that includes the maximum timestamp value for each object type in the conversation.

9. The communication method of claim 8, further comprising:
    receiving the timestamp response message at the first client;
    analyzing the timestamp response message to determine whether the conversation has changed since the conversation was downloaded to the first client last time;
    if the conversation has changed since the conversation was downloaded to the first client last time,
        sending a timestamp profile request to the host server;
        receiving a timestamp profile response that includes a summary of what has changed in the conversation; and
        sending a data update request to the host server, the data update request requesting the host server to send changes in the stored conversation.

10. The communication method of claim 9, wherein analyzing the timestamp response message includes comparing the maximum timestamp value of each object type in the timestamp response message to a maximum timestamp value of a corresponding object type maintained locally at the first client.

11. The communication method of claim 1, further comprising:
retrieving a configuration file template that includes a parameter;
retrieving a property file that includes a key and a value paired with the key;
mapping the parameter in the configuration file template to the key;
substituting the parameter with the value paired with the key, thereby generating a configuration file to be used to configure the host server.

12. The communication method of claim 11, wherein the value is encrypted using an encryption key, and is decrypted at the host server by receiving a decryption key from a management system.

13. An apparatus comprising:
an interface that is configured to provide communication with a first client and a second client;
a memory that is configured to maintain an encrypted private key and an encrypted secret key associated with the first client, wherein the encrypted private key is derived from encrypting a private key of the first client with a secret key of the first client, and wherein the encrypted secret key is derived from encrypting the secret key using authentication bits of the first client;
a module that is configured to receive an encrypted conversation, an encrypted decryption key, and authentication bits associated with the first client, the module configured to retrieve a decryption key for the encrypted conversation by retrieving the secret key from the encrypted secret key using the authentication bits, by retrieving the private key from the encrypted private key using the secret key, and by decrypting the encrypted decryption key using the private key, the module further configured to generate a second key by encrypting the decryption key using a second public key associated with a second user at the second client, and to send to the second client the encrypted conversation and the second key, wherein the module is further configured to receive, from the first client, a password reset notification notifying that a password associated with the first user is lost; receive new authentication bits derived from a new password to be associated with the first user; retrieve a backup secret key associated with the first user, wherein the backup secret key is encrypted using a master public key; send a password reset request to a management server that maintains a master private key paired with the master public key, wherein the password reset request includes the backup secret key; receive from the management server a password reset response that includes the secret key associated with the first user; encrypt the secret key using the new authentication bits; and store the secret key encrypted using the new authentication bits.

14. The apparatus of claim 13, wherein the memory is further configured to maintain the encrypted conversation and the module is further configured to send to the first client a maximum timestamp value for each object type in the encrypted conversation.

15. The apparatus of claim 13, wherein when the first client has never served a third user, the module is configured to retrieve public/private key associated with the third user, to encrypt public/private key associated with the third user using a client key uniquely associated with the third user operating at the first client, and to send the encrypted public/private key to the first client.

16. The apparatus of claim 13, wherein the memory is configured to maintain a property file and a configuration file template, the property file including a key and a value paired with the key and the configuration file template including a parameter, and wherein the module is configured to generate a configuration file to be used in configuring the apparatus by mapping the parameter in the configuration file template to the key and by substituting the parameter using the value paired with the key.

17. A non-transitory computer-readable medium for execution and when executed operable to:
receive a communication request that includes an encrypted conversation, a first key, and authentication bits, the communication request requesting that a host server sends the encrypted conversation and a decryption key for the encrypted conversation to a second client, wherein the first key is the decryption key that has been encrypted using a first public key associated with a first user at the first client;
in order to retrieve the decryption key from the first key,
retrieve an encrypted secret key associated with the first user;
decrypt the encrypted secret key using the authentication bits included in the communication request received from the first user, thereby retrieving a secret key associated with the first user;
retrieve an encrypted private key associated with the first user;
decrypt the encrypted private key using the secret key associated with the first user, thereby retrieving a private key associated with the first user;
decrypt the first key using the private key associated with the first user, thereby retrieving the decryption key;
encrypt the decryption key using a second public key associated with a second user at the second client to generate a second key;
send to the second client the encrypted conversation and the second key;
receive, from the first client, a password reset notification notifying that a password associated with the first user is lost;
receive new authentication bits derived from a new password to be associated with the first user;
retrieve a backup secret key associated with the first user, wherein the backup secret key is encrypted using a master public key;
send a password reset request to a management server that maintains a master private key paired with the master public key, wherein the password reset request includes the backup secret key;
receive from the management server a password reset response that includes the secret key associated with the first user;
encrypt the secret key using the new authentication bits; and
store the secret key encrypted using the new authentication bits.

18. The non-transitory computer-readable medium of claim 17, wherein the password reset request includes an access key that notifies the maintenance server that the host server is authorized to send the password reset request to the maintenance server.

19. The non-transitory computer-readable medium of claim 17, further operable to:
- retrieve a configuration file template that includes a parameter;
- retrieve a property file that includes a key and a value paired with the key;
- map the parameter in the configuration file template to the key;
- substitute the parameter with the value paired with the key, thereby generating a configuration file to be used to configure the host server.

20. The non-transitory computer-readable medium of claim 19, wherein the value is encrypted using an encryption key, and is decrypted at the host server by receiving a decryption key from a management system.

21. The non-transitory computer-readable medium of claim 17, further operable to:
- receive a registration request from a third client notifying that the third client has never served a third user;
- retrieve X.509 public/private key associated with the third user;
- encrypt the X.509 public/private key using a client key uniquely associated with the third user operating at third client; and
- send the encrypted X.509 public/private key to the third client.

22. The non-transitory computer-readable medium of claim 21, further operable to generate the client key uniquely associated with the third user operating at the third client.

* * * * *